United States Patent
Terry et al.

(10) Patent No.: US 12,024,997 B2
(45) Date of Patent: Jul. 2, 2024

(54) SYSTEMS AND METHODS FOR DETERMINING WATER DEPTH AND EXPLOSIVE DEPTH IN BLASTHOLES

(71) Applicant: Dyno Nobel Asia Pacific Pty Limited, Southbank (AU)

(72) Inventors: Paul Terry, Murarrie (AU); John Myers, Murarrie (AU)

(73) Assignee: Dyno Nobel Asia Pacific Pty Limited (AU)

( * ) Notice: Subject to any disclaimer, the term of this patent is extended or adjusted under 35 U.S.C. 154(b) by 151 days.

(21) Appl. No.: 17/454,211

(22) Filed: Nov. 9, 2021

(65) Prior Publication Data
US 2022/0146243 A1 May 12, 2022

(30) Foreign Application Priority Data
Nov. 10, 2020 (AU) ................................ 2020904099

(51) Int. Cl.
*E21B 47/04* (2012.01)
*E21B 47/047* (2012.01)
(Continued)

(52) U.S. Cl.
CPC ............ *E21B 47/04* (2013.01); *E21B 47/047* (2020.05); *E21B 47/07* (2020.05); *G01F 23/24* (2013.01);
(Continued)

(58) Field of Classification Search
CPC ..... F42D 1/08; F42D 1/10; F42D 3/04; E21B 47/04; E21B 47/047; E21B 47/005; E21B 47/07
(Continued)

(56) References Cited

U.S. PATENT DOCUMENTS

| | | |
|---|---|---|
| 3,104,584 A | 9/1963 | Jacobs |
| 3,361,023 A | 1/1968 | Collins et al. |
| (Continued) | | |

FOREIGN PATENT DOCUMENTS

| | | |
|---|---|---|
| AU | 2019232794 | 4/2020 |
| CN | 201941649 | 8/2011 |
| (Continued) | | |

OTHER PUBLICATIONS

Beyond Blasting, Explosives and Blasting, 32 International Mining https://www.orica.com/ArticleDocuments/2202/Editorial_%20EXPLOSIVES%20AND%20BLASTING_International%20Mining.pdf.aspx?Emibed=Y ,Aug. 2019.
(Continued)

*Primary Examiner* — James S Bergin
(74) *Attorney, Agent, or Firm* — Dorsey & Whitney LLP

(57) ABSTRACT

An explosive delivery system for dipping and loading a blasthole to determine water depth and explosive depth in blasthole. The explosive delivery system includes a vehicle with a first reservoir configured to store an explosive and a delivery apparatus reel mounted to the vehicle with a delivery apparatus stored on the delivery apparatus reel. The delivery apparatus having a central bore that extends a length of the delivery apparatus from a proximal end to a distal end of the delivery apparatus and an outlet disposed at the distal end. The explosive delivery apparatus is configured to deliver the explosive out of the outlet of the delivery apparatus. The delivery apparatus includes a plurality of level sensors disposed on an outer surface of the delivery apparatus and that are dispersed along the delivery apparatus. Each of the level sensors is configured to determine if it is disposed in water, air, or explosive.

20 Claims, 10 Drawing Sheets

(51) Int. Cl.
*E21B 47/07* (2012.01)
*F42D 1/08* (2006.01)
*G01F 23/24* (2006.01)
*G01F 23/26* (2022.01)
*F42D 1/10* (2006.01)
*F42D 5/00* (2006.01)

(52) U.S. Cl.
CPC ............... *G01F 23/26* (2013.01); *F42D 1/10* (2013.01); *F42D 5/00* (2013.01)

(58) Field of Classification Search
USPC ........................................................ 102/313
See application file for complete search history.

(56) References Cited

U.S. PATENT DOCUMENTS

| | | |
|---|---|---|
| 3,380,333 A | 4/1968 | Clay et al. |
| 3,617,401 A | 11/1971 | Mortensen et al. |
| 3,877,373 A | 4/1975 | Bergmann et al. |
| 3,979,958 A | 9/1976 | Janssen et al. |
| 4,036,099 A | 7/1977 | French |
| 4,041,865 A | 8/1977 | Evans et al. |
| 4,047,987 A | 9/1977 | Kusakabe et al. |
| 4,239,286 A | 12/1980 | Coursen |
| 4,501,199 A | 2/1985 | Mashimo et al. |
| 4,508,035 A | 4/1985 | Mashimo et al. |
| 4,526,633 A | 7/1985 | Lawrence et al. |
| 4,592,282 A | 6/1986 | Niemi et al. |
| 5,098,163 A | 5/1992 | Young, III |
| 5,465,798 A | 11/1995 | Edlund et al. |
| 5,524,523 A | 6/1996 | Lubbe et al. |
| 5,686,685 A | 11/1997 | McDonald et al. |
| 5,765,923 A | 6/1998 | Watson et al. |
| 5,851,580 A | 12/1998 | Amberg et al. |
| 6,079,333 A | 6/2000 | Manning |
| 6,102,484 A | 8/2000 | Young, III |
| 6,145,933 A | 11/2000 | Watson et al. |
| 6,422,145 B1 | 7/2002 | Gavrilovic et al. |
| 6,435,096 B1 | 8/2002 | Watson |
| 6,460,462 B1 | 10/2002 | Rosenstuck |
| 6,460,630 B2 | 10/2002 | Ahtola et al. |
| 6,616,244 B2 | 9/2003 | Hakkinen |
| 6,982,015 B2 | 1/2006 | Atkinson et al. |
| 7,021,216 B1 | 4/2006 | Dragne et al. |
| 7,069,124 B1 | 6/2006 | Whittaker et al. |
| 7,103,510 B2 | 9/2006 | Moolman et al. |
| 7,370,565 B2 | 5/2008 | Pressley et al. |
| 7,492,279 B2 | 2/2009 | Uitto |
| 7,568,429 B2 | 8/2009 | Hummel et al. |
| 7,578,237 B2 | 8/2009 | Johnston et al. |
| 7,643,934 B2 | 1/2010 | Makela |
| 7,650,841 B2 | 1/2010 | McClure et al. |
| 7,654,317 B2 | 2/2010 | Uitto |
| 7,778,006 B2 | 8/2010 | Stewart et al. |
| 7,810,430 B2 | 10/2010 | Chan et al. |
| 7,929,270 B2 | 4/2011 | Hummel et al. |
| 7,942,481 B2 | 5/2011 | Leppanen |
| 8,011,447 B2 | 9/2011 | Keniston |
| 8,038,812 B2 | 10/2011 | Halander et al. |
| 8,256,349 B2 | 9/2012 | Moore |
| 8,261,664 B2 | 9/2012 | Lengeling et al. |
| 8,342,261 B2 | 1/2013 | Ahola et al. |
| 8,392,014 B2 | 3/2013 | Saleniemi et al. |
| 8,395,878 B2 | 3/2013 | Stewart et al. |
| 8,418,618 B2 | 4/2013 | Ahola et al. |
| 8,512,489 B2 | 8/2013 | Rancourt |
| 8,836,534 B2 | 9/2014 | Field |
| 8,861,172 B2 | 10/2014 | Hummel et al. |
| 8,886,382 B2 | 11/2014 | Nettleton et al. |
| 9,004,100 B2 | 4/2015 | Metz et al. |
| 9,091,519 B2 | 7/2015 | Lownds et al. |
| 9,140,122 B2 | 9/2015 | Cho et al. |
| 9,146,553 B2 | 9/2015 | Nettleton et al. |
| 9,170,081 B2 | 10/2015 | Rudinec |
| 9,212,974 B2 | 12/2015 | Russell et al. |
| 9,243,879 B2 | 1/2016 | Thomson et al. |
| 9,267,777 B2 | 2/2016 | Waldock |
| 9,389,055 B2 | 7/2016 | Brent et al. |
| 9,476,256 B2 | 10/2016 | Pursimo et al. |
| 9,500,079 B2 | 11/2016 | Makela |
| 9,678,508 B2 | 6/2017 | Cima |
| 9,708,902 B2 | 7/2017 | Lopez Rodriguez |
| 9,814,918 B2 | 11/2017 | Brearley et al. |
| 9,846,020 B2 | 12/2017 | Mykkanen |
| 9,879,965 B2 | 1/2018 | Zank et al. |
| 9,989,344 B2 | 6/2018 | Zank et al. |
| 10,081,579 B2 | 9/2018 | Cooper et al. |
| 10,086,707 B2 | 10/2018 | Kouvo et al. |
| 10,260,343 B2 | 4/2019 | Puura et al. |
| 10,267,611 B2 | 4/2019 | Lownds et al. |
| 10,300,804 B2 | 5/2019 | Salaso |
| 10,302,406 B2 | 5/2019 | Vicuna Marin et al. |
| 10,310,109 B2 | 6/2019 | Papillon et al. |
| 10,341,639 B2 | 7/2019 | Wang et al. |
| 10,349,035 B2 | 7/2019 | Wang et al. |
| 10,352,165 B2 | 7/2019 | Kodama et al. |
| 10,359,265 B2 | 7/2019 | Van Wyk et al. |
| 10,378,353 B2 | 8/2019 | Wang et al. |
| 10,385,618 B2 | 8/2019 | Van Dyk |
| 10,392,863 B2 | 8/2019 | Muona |
| 10,443,382 B2 | 10/2019 | Baiden |
| 10,465,514 B2 | 11/2019 | Baiden |
| 10,471,595 B2 | 11/2019 | Tan et al. |
| 10,480,319 B2 | 11/2019 | Furge |
| 10,495,432 B2 | 12/2019 | Halander et al. |
| 10,563,967 B2 | 2/2020 | Muller |
| 10,570,736 B2 | 2/2020 | Wang et al. |
| 2004/0007911 A1 | 1/2004 | Smith |
| 2005/0161257 A1 | 7/2005 | Finden et al. |
| 2008/0282925 A1 | 11/2008 | Lownds et al. |
| 2011/0083574 A1 | 4/2011 | Levan et al. |
| 2011/0162888 A1 | 7/2011 | McHugh et al. |
| 2013/0261873 A1 | 10/2013 | Pal et al. |
| 2014/0053750 A1* | 2/2014 | Lownds ................... F42D 1/05 361/248 |
| 2016/0003028 A1 | 1/2016 | Aklestad et al. |
| 2016/0033249 A1 | 2/2016 | Alexander |
| 2016/0047220 A1 | 2/2016 | Sharp et al. |
| 2016/0215622 A1 | 7/2016 | Nelson |
| 2017/0314331 A1 | 11/2017 | McCracken et al. |
| 2018/0106584 A1 | 4/2018 | Santos et al. |
| 2018/0120073 A1 | 5/2018 | Liebenberg et al. |
| 2018/0216451 A1 | 8/2018 | Huikkola et al. |
| 2018/0266247 A1 | 9/2018 | Lundh et al. |
| 2019/0048705 A1 | 2/2019 | McHugh et al. |
| 2019/0186249 A1 | 6/2019 | Alexandrov et al. |
| 2019/0234722 A1 | 8/2019 | Averett et al. |
| 2019/0257632 A1 | 8/2019 | Nelson et al. |
| 2019/0316461 A1 | 10/2019 | Cavanough |
| 2019/0323811 A1 | 10/2019 | Steele et al. |
| 2019/0353186 A1 | 11/2019 | Redfern |
| 2020/0003035 A1* | 1/2020 | Al-Gouhi ................ E21B 43/12 |
| 2020/0018139 A1 | 1/2020 | Eitschberger et al. |
| 2020/0088030 A1 | 3/2020 | Boyce et al. |
| 2020/0116466 A1 | 4/2020 | Erickson et al. |
| 2021/0310780 A1* | 10/2021 | Winkel ..................... F42D 3/04 |

FOREIGN PATENT DOCUMENTS

| | | |
|---|---|---|
| CN | 102173965 | 9/2011 |
| CN | 202066435 | 12/2011 |
| CN | 202109869 | 1/2012 |
| CN | 203148322 | 8/2012 |
| CN | 202485571 | 10/2012 |
| CN | 202709900 | 1/2013 |
| CN | 202947545 | 5/2013 |
| CN | 203212502 | 9/2013 |
| CN | 203479186 | 3/2014 |
| CN | 203602524 | 5/2014 |
| CN | 102840797 | 5/2015 |
| CN | 104634201 | 5/2015 |
| CN | 103983149 | 6/2015 |
| CN | 204555855 | 8/2015 |

(56) References Cited

FOREIGN PATENT DOCUMENTS

| | | |
|---|---|---|
| CN | 104949594 | 9/2015 |
| CN | 204630495 | 9/2015 |
| CN | 103606171 | 1/2016 |
| CN | 205262311 | 5/2016 |
| CN | 105300206 | 3/2017 |
| CN | 107542401 | 1/2018 |
| CN | 107560511 | 1/2018 |
| CN | 107677167 | 2/2018 |
| CN | 106091850 | 6/2018 |
| CN | 109238063 | 1/2019 |
| CN | 109827482 | 5/2019 |
| CN | 110057259 | 7/2019 |
| CN | 110206528 | 9/2019 |
| CN | 209371905 | 9/2019 |
| CN | 108168386 | 10/2019 |
| CN | 108344336 | 11/2019 |
| CN | 209894061 | 1/2020 |
| CN | 110749256 | 2/2020 |
| CN | 110849225 | 2/2020 |
| CN | 210108168 | 2/2020 |
| CN | 110906817 | 3/2020 |
| CN | 210346502 | 4/2020 |
| DE | 3729140 | 3/1989 |
| EA | 028758 | 12/2017 |
| EP | 1571136 | 3/2005 |
| EP | 3098031 | 9/2017 |
| EP | 3119735 | 3/2019 |
| EP | 3119736 | 3/2019 |
| ES | 469344 | 6/1993 |
| GB | 2187490 | 9/1987 |
| IN | 2018131006868 | 8/2018 |
| JP | 2965938 | 8/1999 |
| JP | 3426676 | 5/2003 |
| JP | 2019113194 | 7/2019 |
| JP | 2019113199 | 7/2019 |
| JP | 2020003145 | 1/2020 |
| KR | 100478682 | 3/2005 |
| KR | 101808765 | 1/2018 |
| PL | 176958 | 7/1995 |
| RU | 2341766 | 12/2008 |
| RU | 2557264 | 7/2015 |
| RU | 171795 | 6/2017 |
| WO | 19952076 | 8/1995 |
| WO | 2002075115 | 9/2002 |
| WO | 2003042626 | 3/2003 |
| WO | 2011106830 | 9/2011 |
| WO | 2012150541 | 11/2012 |
| WO | 2013098459 | 7/2013 |
| WO | 2014063188 | 5/2014 |
| WO | 2014186822 | 11/2014 |
| WO | 2015054720 | 4/2015 |
| WO | 2017041830 | 3/2017 |
| WO | 2018223184 | 12/2018 |
| WO | 2019088899 | 5/2019 |
| WO | 2019145598 | 8/2019 |
| WO | 2019168469 | 9/2019 |
| WO | 2020000054 | 1/2020 |
| WO | 2020000057 | 1/2020 |
| WO | 2020028951 | 2/2020 |
| WO | 2020047560 | 3/2020 |

OTHER PUBLICATIONS

Blast Hole Charging Automation, Robotics and Autonomous Systems Group, Accessed May 14, 2020 https://research.cisiro.au/rpbptocs/blast-hole-charging-automation/.

Mining Robots Move People Away from Unsafe Areas and Towards the Automomous Mine Vision, ABB, accessed May 14, 2020 from https://new.abbcom/mining/mineoptimize/systems-solutions/mining-automation/mining-robots-move-peopel-away-from-unsafe-areas-and-towards-the-antonomous-mine-vision.

* cited by examiner

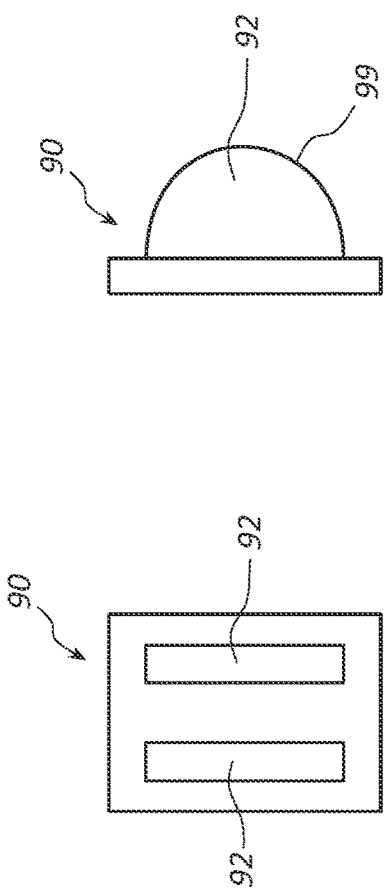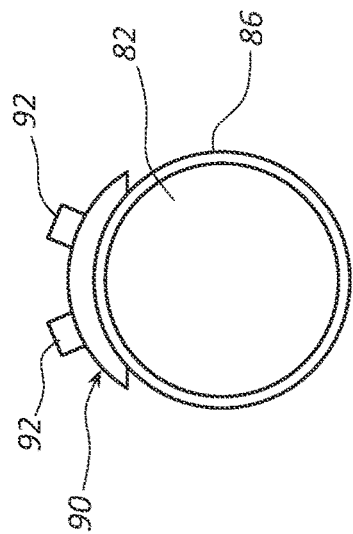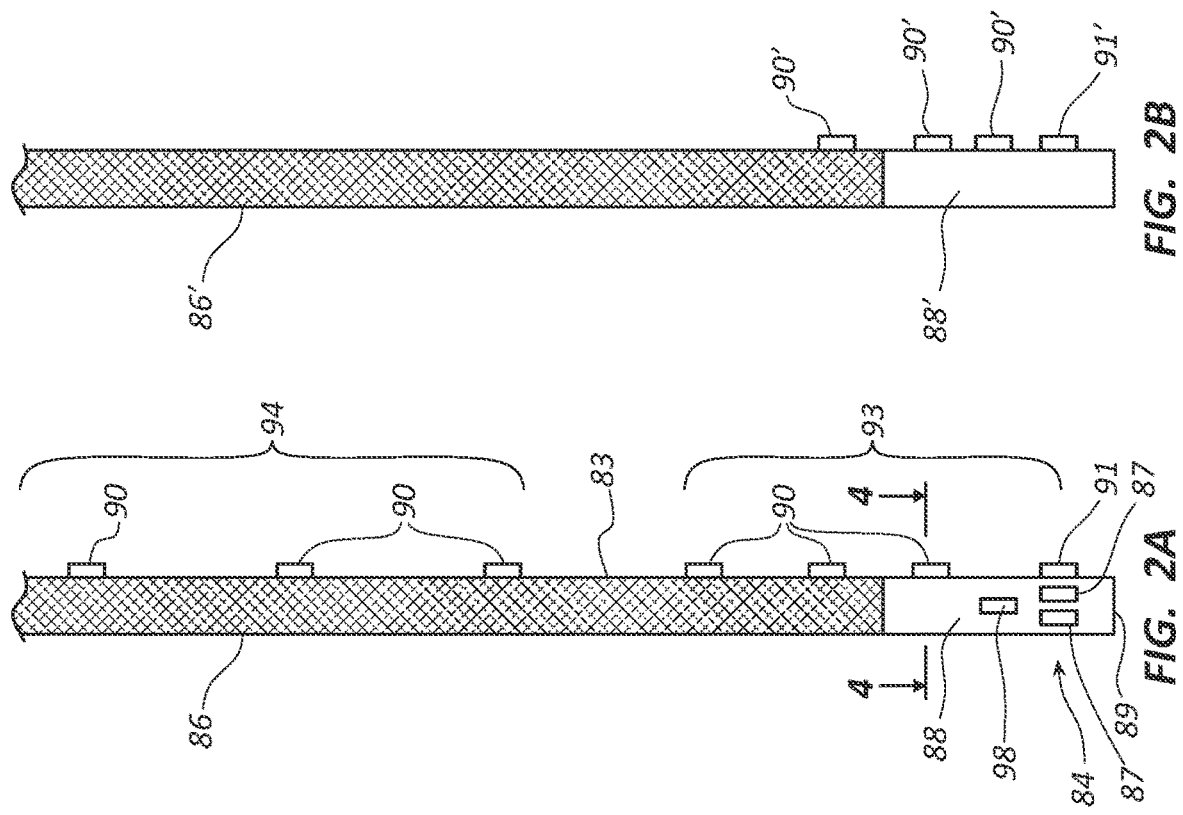

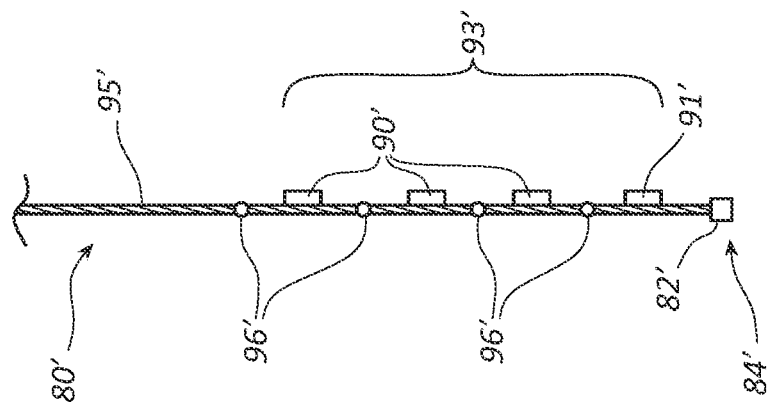
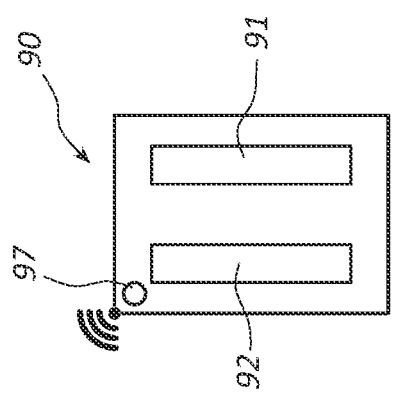
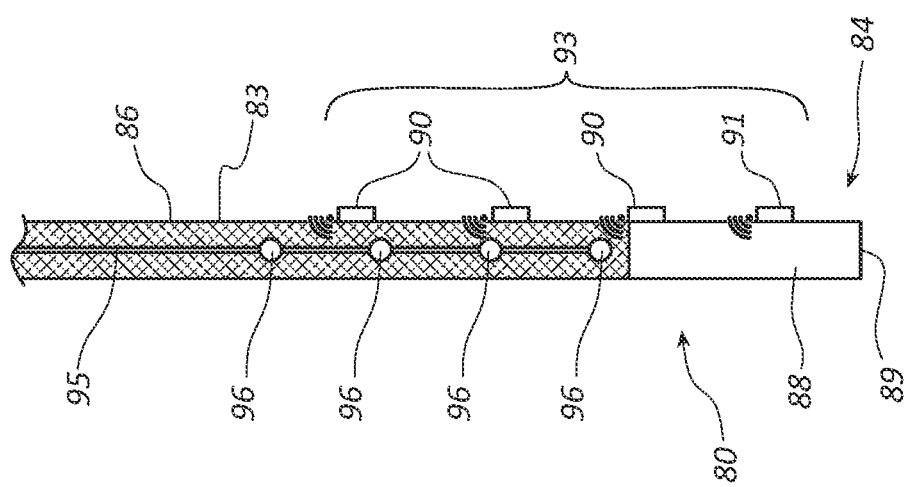

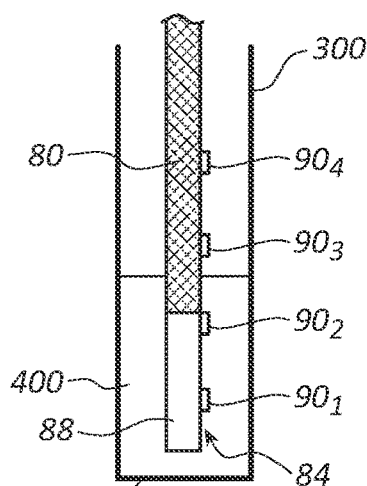
FIG. 9
| Sensor | Air | Water | Product |
|---|---|---|---|
| 90₁ Sensor | | X | |
| 90₂ Sensor | | X | |
| 90₃ Sensor | X | | |
| 90₄ Sensor | X | | |
FIG. 10
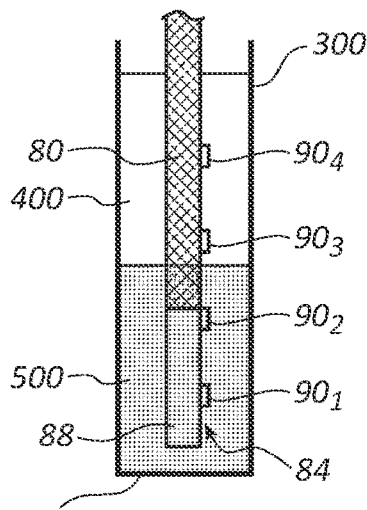
FIG. 11
| Sensor | Air | Water | Product |
|---|---|---|---|
| 90₁ Sensor | | | X |
| 90₂ Sensor | | | X |
| 90₃ Sensor | | X | |
| 90₄ Sensor | | X | |
FIG. 12
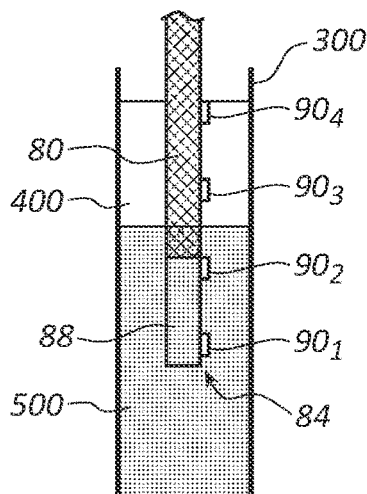
FIG. 13
| Sensor | Air | Water | Product |
|---|---|---|---|
| 90₁ Sensor | | | X |
| 90₂ Sensor | | | X |
| 90₃ Sensor | | X | |
| 90₄ Sensor | | X | |
FIG. 14

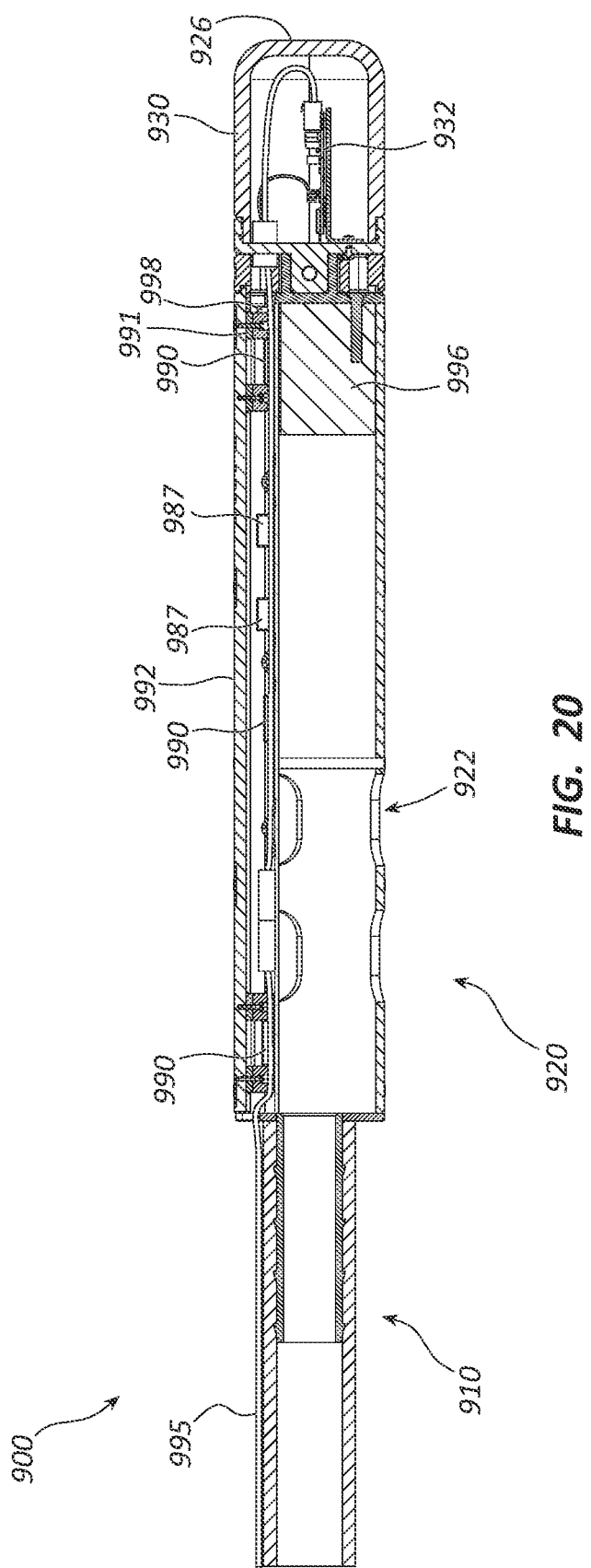

SYSTEMS AND METHODS FOR DETERMINING WATER DEPTH AND EXPLOSIVE DEPTH IN BLASTHOLES

RELATED APPLICATIONS

This application claims priority to Australian Provisional Patent Application No. 2020904099, entitled SYSTEMS AND METHODS FOR DETERMINING WATER DEPTH AND EXPLOSIVE DEPTH IN BLASTHOLES, filed Nov. 10, 2020, which is hereby incorporated by reference in its entirety.

TECHNICAL FIELD

The present disclosure relates generally to the field of explosives. More specifically, the present disclosure relates to systems and methods for determining the water depth and explosive depth in blastholes.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 2A illustrates a detailed side view of the delivery apparatus of FIG. 1, the delivery apparatus having a plurality of level sensors disposed along an outer surface of the delivery apparatus according to one embodiment of the present disclosure.

FIG. 2B illustrates a detailed side view of a delivery apparatus having a plurality of level sensors disposed near a distal end of the delivery apparatus according to another embodiment of the present disclosure.

FIG. 3A illustrates a detailed front view of one of the plurality of level sensors disposed along a delivery apparatus according to one embodiment of the present disclosure.

FIG. 3B illustrates a detailed side view of the level sensor of FIG. 3A.

FIG. 4 illustrates a top view of a delivery apparatus with a plurality of level sensors disposed along an outer surface of the delivery apparatus according to one embodiment of the present disclosure.

FIG. 6 illustrates a side view of a delivery apparatus having a plurality of level sensors disposed along an outer surface and a communication medium that communicates with the plurality of level sensors according to another embodiment of the present disclosure.

FIG. 7 illustrates a detailed front view of one of the plurality of level sensors with a transmitter to communicate with the communication medium of FIG. 6.

FIG. 8 illustrates a side view of a cable having a plurality of level sensors disposed along an outer surface and a communication medium that communicates with the plurality of level sensors according to another embodiment of the present disclosure.

FIG. 9 illustrates a delivery apparatus lowered into a blasthole and performing a dipping operation to determine the depth of the blasthole and determine the presence and level of water in the blasthole according to an embodiment of the present disclosure.

FIG. 10 illustrates a chart of data collected by a plurality of level sensors disposed on an outer surface of the delivery apparatus of FIG. 9.

FIG. 11 illustrates a delivery apparatus lowered into a blasthole and loading the blasthole with an explosive according to an embodiment of the present disclosure.

FIG. 12 illustrates a chart of data collected by a plurality of level sensors disposed on an outer surface of the delivery apparatus of FIG. 11.

FIG. 13 illustrates a delivery apparatus lowered into a blasthole and loading the blasthole with explosive and being partially retracted from the blasthole according to an embodiment of the present disclosure.

FIG. 14 illustrates a chart of data collected by a plurality of level sensors disposed on an outer surface of the delivery apparatus of FIG. 13.

FIG. 20 illustrates a cross-sectional view of the distal portion of the delivery apparatus of FIG. 18.

DETAILED DESCRIPTION

Figure 1:
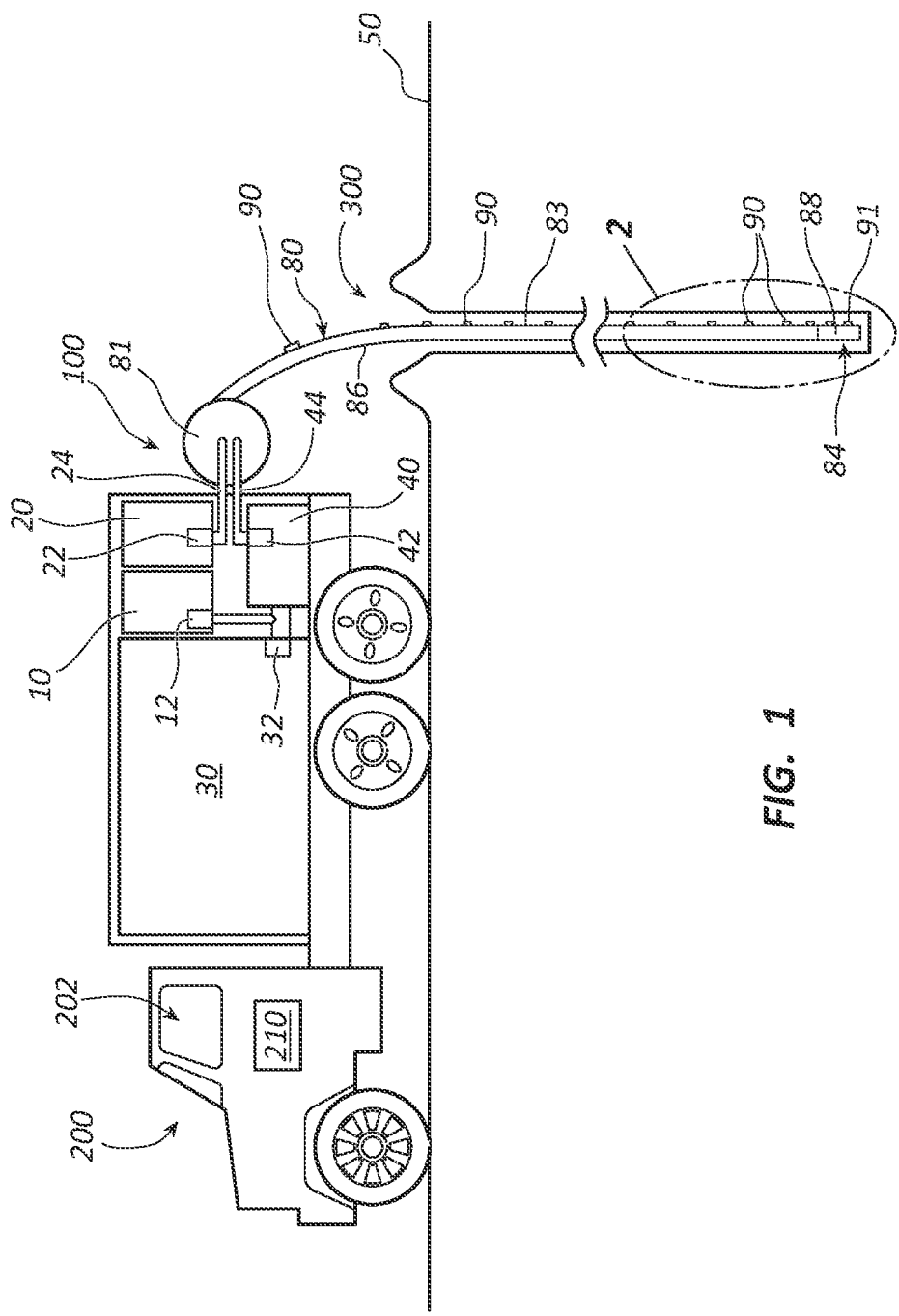
FIG. 1 illustrates a side view of one embodiment of a mobile processing unit equipped with an explosives delivery system that includes a delivery apparatus for delivering an explosive into a blasthole according to one embodiment of the present disclosure.

Explosives are commonly used in the mining, quarrying, and excavation industries for breaking rocks and ore. Generally, a hole, referred to as a "blasthole," is drilled in a surface, such as the ground. A plurality of blastholes may be drilled during the drilling process. During the drilling of the blasthole, the dimensions of the blasthole are usually obtained, for example, the depth of the blasthole, the diameter of the blasthole, the volume of the blasthole, the rock hardness of the ground, and various other dimensions and characteristics of the blasthole and the surrounding ground.

After the blasthole is drilled, the blasthole may be dipped. Dipping is the process of checking the readiness of the blasthole for blasting and may include confirming the depth of the blasthole, checking the structural integrity of the blasthole, and checking for the presence and level of water in the blasthole.

Typically, after the blasthole is dipped, the blasthole is baited. Baiting (or priming) is the process of loading a denotator and booster into the blasthole.

Typically, after the blasthole is baited, the blasthole is loaded with an explosive. A variety of different kinds of explosives may then be loaded into the blasthole. The explosives may be loaded in various ways, such as, for example, by pumping the explosive into the blasthole or auguring the explosive into the blasthole. Exemplary explosives may include sensitized emulsion explosives, ammonium nitrate/fuel oil (ANFO) explosives, or blends thereof (including heavy ANFO or other ANFO blends). Water gel explosives can also be used. Typically, emulsion explosives are pumped into the blasthole and ANFO explosives are augured or pumped into the blasthole.

Emulsion explosives are generally transported to a job site as an emulsion matrix that is too dense to completely detonate. In general, the emulsion matrix needs to be "sensitized" in order for the emulsion explosive to detonate successfully. Sensitizing is often accomplished by introducing a sensitizing agent that either provides or generates small voids into the emulsion matrix. These voids reduce the density of the emulsion explosive and also act as hot spots for propagating detonation. The sensitizing agent may be gas bubbles introduced by blowing a gas into the emulsion matrix, hollow microspheres or other porous media, and/or chemical gassing agents that are injected into and react with the emulsion matrix and thereby form gas bubbles. With chemical gassing agents, a certain amount of time is generally required before "gassing" is complete. For purposes of this disclosure, once a sensitizing agent is fully mixed with an emulsion matrix, the resulting emulsion is considered an emulsion explosive and sensitized, even though sensitization may not be complete for a certain amount of time.

ANFO explosives are generally transported to the job site as ammonium nitrate prill that does not detonate successfully without the additional of a fuel oil. Blends of ANFO explosives and emulsion explosives can also be used, such as heavy ANFO or other ANFO blends.

For vertical blastholes, depending upon the length, detonators may be placed at the end, also referred to as the "toe," of the blasthole and at the top of the emulsion explosives. Often, in such situations, the top of the blasthole will not be filled with explosives, but will be filled with an inert material, referred to as "stemming," to try to keep the force of an explosion within the material surrounding the blasthole, rather than allowing explosive gases and energy to escape out of the open end of the blasthole.

Systems for delivering explosives and methods related thereto are disclosed herein. It will be readily understood that the components of the embodiments as generally described below and illustrated in the Figures herein could be arranged and designed in a wide variety of different configurations. Thus, the following more detailed description of various embodiments, as described below and represented in the Figures, is not intended to limit the scope of the disclosure, but is merely representative of various embodiments. While the various aspects of the embodiments are presented in drawings, the drawings are not necessarily drawn to scale unless specifically indicated.

The phrase "coupled to" refers to any form of interaction between two or more entities, including mechanical, electrical, magnetic, electromagnetic, fluid, and thermal interaction. Likewise, "fluidically connected to" refers to any form of fluidic interaction between two or more entities. Two entities may interact with each other even though they are not in direct contact with each other. For example, two entities may interact with each other through an intermediate entity.

The term "substantially" is used herein to mean almost and including 100%, including at least about 80%, at least about 90%, at least about 91%, at least about 92%, at least about 93%, at least about 94%, at least about 95%, at least about 96%, at least about 97%, at least about 98%, and at least about 99%.

The term "proximal" is used herein to refer to "near" or "at" the object disclosed. For example, "proximal the outlet of the delivery conduit" refers to near or at the outlet of the delivery conduit.

Embodiments and implementations of explosive delivery systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines that communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, an SoC, an SiP, an FPGA, a PAL, a PLA, an FPLA, a PLD, or other customized or programmable device. The memory may include static RAM, dynamic RAM, flash memory, one or more flip-flops, ROM, CD-ROM, disk, tape, magnetic, optical, or another computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, an optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions that cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, a program, an object, a component, a data structure, etc. that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

FIG. 1 illustrates an explosives delivery system 100 for surface blast charging. For brevity, the present disclosure focuses on surface blast charging; however, the explosives delivery system 100 discussed in the present disclosure may be used in a number of different types of blast charging, such as development blast charging, underground blasting, and the like.

FIG. 1 is a side view of one embodiment of a mobile processing unit 200 equipped with the explosives delivery system 100. The explosives delivery system 100 may include a delivery apparatus 80, such as a delivery hose. While FIG. 1 illustrates the delivery apparatus 80 in conjunction with the mobile processing unit 200, in some embodiments, the delivery apparatus 80 is not associated with a vehicle. The mobile processing unit 200 may be configured to go underground for underground blasting. The mobile processing unit 200 may be controlled or operated by an operator. The operator may control the mobile processing unit 200 from a cabin 202 of the mobile processing unit 200 or from a remote location, such as a mining control center. In some embodiments, the mobile processing unit 200 is an autonomous vehicle.

The mobile processing unit 200 may include a first reservoir 10, a second reservoir 20, a third reservoir 30, and a homogenizer 40 mounted to the mobile processing unit 200. Different types of blast charging may use some but not all of the components listed above. For example, in some embodiments, the first reservoir 10, the second reservoir 20, the homogenizer 40, and combinations thereof may be optional components. The mobile processing unit 200 is positioned or placed near a blasthole 300 drilled into the ground 50. For simplicity, a single blasthole 300 is illustrated, but a plurality of blastholes may be drilled into the ground 50.

In some embodiments, the first reservoir 10 is configured to store a first gassing agent (such as a pH control agent), the second reservoir 20 is configured to store a second gassing agent (such as a chemical gassing agent), and the third reservoir 30 is configured to store an emulsion matrix. The homogenizer 40 is configured to mix the emulsion matrix, the first gassing agent, and optionally the second gassing agent into a substantially homogenized emulsion matrix. For example, in FIG. 1, the second gassing agent is introduced after the homogenizer 40; however, the second gassing agent may be introduced before the homogenizer 40.

In some embodiments, the first gassing agent comprises a pH control agent. The pH control agent may comprise an acid. Examples of acids include, but are not limited to, organic acids such as citric acid, acetic acid, and tartaric acid. Any pH control agent known in the art and compatible with the second gassing agent and a gassing accelerator, if present, may be used. The pH control agent may be dissolved in an aqueous solution.

In some embodiments, the second gassing agent comprises a chemical gassing agent configured to react in an emulsion matrix and with a gassing accelerator, if present. Examples of chemical gassing agents include, but are not limited to, peroxides such as hydrogen peroxide, inorganic nitrite salts such as sodium nitrite, nitrosamines such as N,N'-dinitrosopentamethylenetetramine, alkali metal borohydrides such as sodium borohydride, and bases such as carbonates including sodium carbonate. Any chemical gassing agent known in the art and compatible with the emulsion matrix and the gassing accelerator, if present, may be used. The chemical gassing agent may be dissolved in an aqueous solution and stored in the second reservoir 20.

In some embodiments, second reservoir 20 is further configured to store a gassing accelerator mixed with the second gassing agent. Alternatively, the gassing accelerator may be stored in a separate reservoir or not present in the system. Examples of gassing accelerators include, but are not limited to, thiourea, urea, thiocyanate, iodide, cyanate, acetate, sulphonic acid and its salts, and combinations thereof. Any gassing accelerator known in the art and compatible with the first gassing agent and the second gassing agent may be used. The pH control agent, the chemical gassing agent, and the gassing accelerator may each be dissolved in an aqueous solution.

In some embodiments, the emulsion matrix comprises a continuous fuel phase and a discontinuous oxidizer phase. Any emulsion matrix known in the art may be used, such as, by way of non-limiting example, the Titan® 1000 G from Dyno Nobel.

Examples of the fuel phase include, but are not limited to, liquid fuels such as fuel oil, diesel oil, distillate, furnace oil, kerosene, gasoline, and naphtha; waxes such as microcrystalline wax, paraffin wax, and slack wax; oils such as paraffin oils, benzene, toluene, and xylene oils; asphaltic materials; polymeric oils such as the low molecular weight polymers of olefins; animal oils, such as fish oils, and other mineral, hydrocarbon, or fatty oils; and mixtures thereof. Any fuel phase known in the art and compatible with the oxidizer phase and an emulsifier, if present, may be used.

The emulsion matrix may provide at least about 95%, at least about 96%, or at least about 97% of the oxygen content of the sensitized product.

Examples of the oxidizer phase include, but are not limited to, oxygen-releasing salts. Examples of oxygen-releasing salts include, but are not limited to, alkali and alkaline earth metal nitrates, alkali and alkaline earth metal chlorates, alkali and alkaline earth metal perchlorates, ammonium nitrate, ammonium chlorate, ammonium perchlorate, and mixtures thereof, such as a mixture of ammonium nitrate and sodium or calcium nitrates. Any oxidizer phase known in the art and compatible with the fuel phase and an emulsifier, if present, may be used. The oxidizer phase may be dissolved in an aqueous solution, resulting in an emulsion matrix known in the art as a "water-in-oil" emulsion. The oxidizer phase may not be dissolved in an aqueous solution, resulting in an emulsion matrix known in the art as a "melt-in-oil" emulsion.

In some embodiments, the emulsion matrix further comprises an emulsifier. Examples of emulsifiers include, but are not limited to, emulsifiers based on the reaction products of poly[alk(en)yl]succinic anhydrides and alkylamines, including the polyisobutylene succinic anhydride (PiBSA) derivatives of alkanolamines. Additional examples of emulsifiers include, but are not limited to, alcohol alkoxylates, phenol alkoxylates, poly(oxyalkylene)glycols, poly(oxyalkylene) fatty acid esters, amine alkoxylates, fatty acid esters of sorbitol and glycerol, fatty acid salts, sorbitan esters, poly(oxyalkylene)sorbitan esters, fatty amine alkoxylates, poly(oxyalkylene)glycol esters, fatty acid amines, fatty acid amide alkoxylates, fatty amines, quaternary amines, alkyloxazolines, alkenyloxazolines, imidazolines, alkylsulphonates, alkylsulphosuccinates, alkylarylsulphonates, alkylphosphates, alkenylphosphates, phosphate esters, lecithin, copolymers of poly(oxyalkylene)glycol and poly(12-hydroxystearic) acid, 2-alkyl and 2-alkenyl-4,4'-bis(hydroxymethyl)oxazoline, sorbitan mono-oleate, sorbitan sesquioleate, 2-oleyl-4,4'bis(hydroxymethyl)oxazoline, and mixtures thereof. Any emulsifier known in the art and compatible with the fuel phase and the oxidizer phase may be used.

The explosives delivery system 100 may further comprise a first pump 12 configured to pump the first gassing agent. The inlet of the first pump 12 is fluidically connected to the first reservoir 10. The outlet of the first pump 12 is fluidically connected to a flowmeter configured to measure a stream of the first gassing agent. The first flowmeter is fluidically connected to the homogenizer 40. The stream of the first gassing agent may be introduced into a stream of the emulsion matrix upstream from the homogenizer 40.

The explosives delivery system 100 may further comprise a second pump 22 configured to pump the second gassing agent. The inlet of the second pump 22 is operably connected to the second reservoir 20. The outlet of the second pump 22 is fluidically connected to a second flowmeter configured to measure the flow in a stream of the second gassing agent. The second flowmeter is fluidically connected to a valve. The valve is configured to control the stream of the second gassing agent. The valve is fluidically connected to a mixer proximal the outlet of the delivery apparatus 80.

The delivery apparatus 80 may have a central bore that extends a length of the delivery apparatus 80 from a proximal end to a distal end 84 of the delivery apparatus 80 and an outlet disposed at the distal end 84. In some embodiments, the delivery apparatus 80 is a delivery hose. The delivery apparatus 80 is configured to deliver an emulsion explosive out of the outlet at the distal end 84 of the delivery apparatus 80.

The explosives delivery system 100 may further comprise a third pump 32 configured to pump the emulsion matrix. The inlet of the third pump 32 is fluidically connected to the third reservoir 30. The outlet of the third pump 32 is fluidically connected to a third flowmeter configured to measure a stream of the emulsion matrix. The third flowmeter is fluidically connected to the homogenizer 40. In embodiments that do not include the homogenizer 40, the third flowmeter, if present, may be fluidically connected to the delivery apparatus 80.

In some embodiments, the explosives delivery system 100 is configured to convey the second gassing agent at a mass flow rate of less than about 5%, less than about 4%, less than about 2%, or less than about 1% of a mass flow rate of the emulsion matrix.

The homogenizer 40 may be configured to homogenize the emulsion matrix when forming the homogenized product. As used herein, "homogenize" or "homogenizing" refers to reducing the size of oxidizer phase droplets in the fuel phase of an emulsion matrix, such as the emulsion matrix. The homogenizing emulsion matrix increases the viscosity of the homogenized emulsion matrix as compared to the unhomogenized emulsion matrix. The homogenizer 40 may also be configured to mix the stream of the emulsion matrix and the stream of the first gassing agent into the homogenized emulsion matrix. The stream of the homogenized emulsion matrix exits the homogenizer 40. Pressure from the stream of the emulsion matrix and the stream of the first gassing agent may supply the pressure for the flowing stream of the homogenized emulsion matrix. The explosives delivery system 100 may comprise a fourth pump 42 that is configured to pump the homogenized emulsion matrix out of the homogenizer 40 through a conduit 44 to the delivery apparatus 80.

The homogenizer 40 may reduce the size of oxidizer phase droplets by introducing a shearing stress on the emulsion matrix and the first gassing agent. The homogenizer 40 may comprise a valve configured to introduce a shearing stress on the emulsion matrix and the first gassing agent. The homogenizer 40 may further comprise mixing elements, such as, by way of non-limiting example, static mixers and/or dynamic mixers, such as augers, for the mixing stream of the first gassing agent with the stream of emulsion matrix.

Homogenizing the emulsion matrix may be beneficial for the sensitized emulsion. For example, the reduced oxidizer phase droplet size and increased viscosity of sensitized emulsion explosive, as compared to an unhomogenized sensitized emulsion explosive, may mitigate gas bubble coalescence of the gas bubbles generated by introduction of the second gassing agent. Likewise, the effects of static head pressure on gas bubble density in a homogenized sensitized emulsion explosive are reduced as compared to an unhomogenized sensitized emulsion explosive. Therefore, gas bubble migration is less in a homogenized sensitized emulsion explosive as compared to an unhomogenized sensitized emulsion explosive.

In some embodiments, the homogenizer 40 does not substantially homogenize the emulsion matrix. In such embodiments, the homogenizer 40 comprises elements primarily configured to mix the stream of the emulsion matrix and the stream of the first gassing agent, but does not include elements primarily configured to reduce the size of oxidizer phase droplets in the emulsion matrix. In such embodiments, sensitized emulsion explosive would be an unhomogenized sensitized emulsion explosive. "Primarily configured" as used herein refers to the main function that an element was configured to perform. For example, any mixing element(s) of homogenizer 40 may have some effect on oxidizer phase droplet size, but the main function of the mixing elements may be to mix the stream of the first gassing agent and the stream of the emulsion matrix.

The second gassing agent from the second reservoir 20 may be introduced into the emulsion matrix (e.g., the homogenized or the unhomogenized emulsion matrix) in a number of different ways to sensitize the emulsion matrix. For example, the second gassing agent may be introduced pre-delivery apparatus 80, via a water ring embodiment, a centerline embodiment, or an end of hose embodiment.

In the water ring and the centerline embodiments, the second reservoir 20 is configured to store the second gassing agent and an injector that is configured to inject the second gassing agent through a conduit 24 to the delivery apparatus 80. In the water ring embodiment, the second gassing agent is injected with the lubricant into the delivery apparatus 80 to lubricate the conveyance of an emulsion matrix (e.g., the homogenized or the unhomogenized emulsion matrix) through the inside of the delivery apparatus 80. The injector may be configured to inject an annulus of the second gassing agent and lubricant that surrounds the stream of the emulsion matrix and lubricates the flow of the emulsion matrix inside the delivery apparatus 80. The lubricant containing the second gassing agent may also contain water. As the stream of the emulsion matrix is conveyed through the delivery apparatus 80, the second gassing agent may begin to sensitize the emulsion matrix somewhat through diffusion. A mixer in the nozzle 88 mixes the lubricant and the second gassing agent with the emulsion matrix, forming a sensitized emulsion explosive.

In the centerline embodiment, the injector may be configured to inject a centerline stream of the second gassing agent that is within the stream of the emulsion matrix. As the stream of the emulsion matrix is conveyed through the delivery apparatus 80, the second gassing agent may begin to sensitize the emulsion matrix somewhat through diffusion. A mixer in the nozzle 88 mixes the lubricant and the second gassing agent with the emulsion matrix, forming a sensitized emulsion explosive.

In the end of hose embodiment, the second gassing agent is conveyed separately from the emulsion matrix in the delivery apparatus 80 and the second gassing agent is injected into the emulsion matrix before the emulsion explosive is expelled from the delivery apparatus 80 and into the blasthole 300. A mixer in the nozzle 88 mixes the lubricant and the second gassing agent with the emulsion matrix, forming a sensitized emulsion explosive. In some embodiments, the second gassing agent is conveyed in the delivery apparatus 80 in a separate tube within a sidewall of the delivery apparatus 80. In an alternative embodiment, a separate tube may be located external to the delivery apparatus 80 for conveying the stream of the second gassing agent. For example, the separate tube may be attached to an outer surface of the delivery apparatus 80.

In some embodiments, the mobile processing unit 200 may comprise other types of explosives or more than one type of explosive to deliver to the blastholes 300 based on different situations. Without limitation, exemplary explosive materials that can be used include, but are not limited to, emulsions (as discussed above), ammonium-nitrate fuel oil ("ANFO"), blends of emulsions and ANFO (e.g., heavy ANFO or other ANFO blends), water gels, and slurries. Additional types of explosives include black powder, dynamites, ammonia gelatin, semi-gelatins, binary explosives, and the like. For instance, as discussed above, the mobile processing unit 200 can comprise a sensitized emulsion explosive that is delivered through the delivery apparatus 80. The mobile processing unit 200 can also comprise an ANFO explosive (in addition to, or in place of, the emulsion explosive) that may be delivered through the delivery apparatus 80 or an auger chute (not shown). ANFO explosive is a combination of ammonium nitrate prill and fuel oil. The mobile processing unit 200 may comprise a fifth reservoir (not shown) configured to store the solid oxidizer, such as ammonium nitrate prill. The explosives delivery system 100 may further comprise a sixth reservoir (not shown) configured to store an additional liquid fuel, separate from the liquid fuel that is part of emulsion matrix. Thus it will be appreciated that the disclosure herein is not limited to emulsion explosives.

In some embodiments, the type of explosive delivered into the blasthole 300 may be dependent on whether water is disposed in the blasthole at the time of delivering the explosive. For instance, if water is detected in the blasthole 300, then a sensitized emulsion explosive may be loaded into the blasthole 300. If no water is detected in the blasthole, then ANFO explosive may be delivered into the blasthole 300. Blends of emulsions and ANFO can also be used as desired. Similarly, water gel explosives or other types of explosives can also be used as desired.

In certain embodiments, the explosives delivery system 100 may be configured for delivering a blend of sensitized product with solid oxidizers and additional liquid fuels. In such embodiments, the delivery apparatus 80 may not be inserted into the blasthole, but instead sensitized product may be blended with solid oxidizer and additional liquid fuel. The resulting blend may be poured into the blasthole 300, such as from the discharge of an auger chute (not shown) located over the mouth of a blasthole.

For example, the explosives delivery system 100 may comprise the fifth reservoir (not shown) configured to store the solid oxidizer. The explosives delivery system 100 may further comprise the sixth reservoir (not shown) configured to store an additional liquid fuel, separate from the liquid fuel that is part of emulsion matrix. A hopper (not shown) may operably connect the fifth reservoir to a mixing element (not shown), such as an auger (not shown). The mixing element may be fluidically connected to the sixth reservoir. The mixing element may also be fluidically connected to the outlet of the delivery apparatus 80 configured to form sensitized product. The mixing element may be configured to blend sensitized product with the solid oxidizer of the fifth reservoir and the liquid fuel of the sixth reservoir. A chute may be connected to the discharge of the mixing element and configured to convey blended sensitized product to the blasthole 300. For example, unsensitized emulsion matrix may be blended in an auger with ammonium nitrate and No. 2 fuel oil to form a "heavy ANFO" blend. Other ANFO blends can also be used.

The explosives delivery system 100 may comprise additional reservoirs for storing solid sensitizers and/or energy increasing agents. These additional components may be mixed with the solid oxidizer of the fifth reservoir or may be mixed directly with homogenized product or sensitized product. In some embodiments, the solid oxidizer, the solid sensitizer, and/or the energy increasing agent may be blended with sensitized product without the addition of any liquid fuel from the sixth reservoir.

Examples of solid sensitizers include, but are not limited to, glass or hydrocarbon microballoons, cellulosic bulking agents, expanded mineral bulking agents, and the like. Examples of energy increasing agents include, but are not limited to, metal powders, such as aluminum powder. Examples of the solid oxidizer include, but are not limited to, oxygen-releasing salts formed into porous spheres, also known in the art as "prills." Examples of oxygen-releasing salts are those disclosed above regarding the oxidizer phase of emulsion matrix. Prills of the oxygen-releasing salts may be used as the solid oxidizer. Any solid oxidizer known in the art and compatible with the liquid fuel may be used. Examples of the liquid fuel are those disclosed above regarding the fuel phase of emulsion matrix. Any liquid fuel known in the art and compatible with the solid oxidizer may be used.

It should be understood that the explosives delivery system 100 may further comprise additional components compatible with delivering explosives.

As discussed above, the type of explosive that is delivered or loaded into the blasthole 300 may be determined based on whether water is present in the blasthole 300 and how much water is present in the blasthole 300. The present explosives delivery system 100 is configured to dip and load the blasthole in substantially the same step.

FIGS. 2A-4 illustrate an exemplary embodiments of the delivery apparatus 80 that is configured to dip and load the blasthole 300. As discussed above, the delivery apparatus 80 may be a delivery hose. FIG. 2A illustrates a side view of a distal portion of the delivery apparatus 80 comprising a plurality of level sensors 90. FIG. 2B illustrates a side view of a distal portion of another embodiment of a delivery apparatus 80'. FIG. 3A is a front view of one of the plurality of level sensors 90. FIG. 3B is a side view of one of the plurality of sensors 90. FIG. 4 is a cross-sectional view of the delivery apparatus 80.

The delivery apparatus 80 may have a predetermined length. For convenience, FIG. 2 does not illustrate the entire length of the delivery apparatus 80, but only a distal portion of the delivery apparatus 80. The delivery apparatus 80 comprises a central bore that extends a length of the delivery apparatus 80 from a proximal end to the distal end 84 of the delivery apparatus 80. A sidewall 86 of the delivery apparatus 80 defines the central bore of the delivery apparatus 80. In the illustrated embodiment, the delivery apparatus 80 comprises a nozzle 88 at the distal end 84 of the delivery apparatus 80, the nozzle 88 comprising an outlet 89 for delivering the explosives out of the delivery apparatus 80 and into the blasthole 300.

To perform the dipping step, the delivery apparatus 80 comprises a plurality of level sensors 90. For convenience, seven level sensors 90 are illustrated on the delivery apparatus 80; however, the delivery apparatus 80 may have more or less than seven level sensors 90. The plurality of level sensors 90 are configured to determine if each sensor of the plurality of level sensors 90 are disposed in air, water, or explosive product. The plurality of level sensors 90 may be used to determine the presence or level (e.g., depth) of a liquid in the blasthole 300. For example, the plurality of level sensors 90 may be used to determine the presence or level of water, the presence or level of explosive, and the like in the blasthole 300. Examples of level sensors 90 that may be used with the delivery apparatus 80 include float switches or sensors, rotary paddle level switches or sensors, hydrostatic level sensors, load cell level sensors, optical level sensors, vibrating level sensors, ultrasonic level sensors, electromagnetic (radar) level sensors, laser level sensors, magnetorestrictive level sensors, capacitive level sensors, conductive or resistive level sensors, and the like.

The plurality of level sensors 90 may be disposed on an outer surface 83 of the delivery apparatus 80. The plurality of level sensors 90 may be hardwired to the explosives delivery system 100 and to the mobile processing unit 200. Wires may run through the sidewall 86 of the delivery apparatus 80 or the outer surface of the delivery apparatus 80 to couple to the plurality of level sensors 90. As illustrated in FIGS. 3A, 3B, and 4, the plurality of level sensors 90 may be capacitance sensors that are configured to detect a capacitance of a predetermined surrounding area of each capacitance sensor. The capacitance sensors rely on the fact that water and the explosive have a different dielectric constant than that of air. FIG. 3A illustrates a front view of one of the level sensors 90 (e.g., capacitance sensor), each capacitance sensor may comprise a pair of metal plates 92 that are parallel with each other. When viewed from the front, the metal plates 92 are rectangular and the longest length of the rectangle is disposed in a longitudinal direction of the delivery apparatus 80. However, the metal plates 92 may have a number of different shapes. For example, the metal plates 92 may be any suitable shape, such as, square, circular, triangular, polygonal, arc shape, and the like. FIG. 3B illustrates a side view of one of the level sensors 90 in which each metal plate 92 projects outward and has an arc shape with an apex 99.

The pair of metal plates 92 measures an electric field across the metal plates 92 and when the capacitance changes, such as will occur when the air between the metal plates 92 is replaced by the water or explosive. The level of height of water or explosive in the blasthole 300 may be determined when adjacent capacitance sensors detect different materials.

In some embodiments, the plurality of level sensors 90 may be conductive or resistive level sensors. Conductive sensors may be used to measure the level of liquid or fluids that are electrically conductive. The sensors may comprise a pair of probes with one probe being longer than the other. When the level of the liquid in the blasthole 300 is high enough to cover both probes, a complete electrically conductive path exists between the probes and the liquid that then activates a semiconductor switch to indicate that the level in the blasthole 300 has reached one of the level sensors 90. If the level of liquid drops below the shorter probe, the shorter probe is no longer immersed in the liquid and then the circuit is opened (conduction ceases), which drops the current flow to zero and shuts off the semiconductor switch.

In some embodiments, the plurality of level sensors 90 may be combo sensors that use both capacitance and conductance. In some embodiments, a plurality of different types of level sensors 90 may be used along the length of the delivery apparatus 80.

The plurality of level sensors 90 may include a first level sensor 91 that is disposed a predetermined distance from the distal end 84 of the delivery apparatus 80. The first level sensor 91 may be disposed on an outer surface of the nozzle 88. In the embodiments that do not include the nozzle 88, the first level sensor 91 may be disposed a predetermined distance from the distal end 84 of the delivery apparatus 80.

In some embodiments, the plurality of level sensors 90 may be equally spaced apart from each other along the longitudinal (e.g., axial) direction of the delivery apparatus 80. For example, the sensors can be spaced between about 4 inches and about 12 inches apart, or between about 4 inches and about 8 inches apart. In some embodiments, the plurality of level sensors 90 may be variably spaced apart from each other along the longitudinal direction of the delivery apparatus 80. In some embodiments, the plurality of level sensors 90 may be spaced apart from each other over a length of about 1 to about 2 meters. The distance between adjacent level sensors 90 may be customized based on the different blasting situations. In some embodiments, the plurality of level sensors 90 may be removably attachable to the delivery apparatus 80 so that the locations of the plurality of level sensors 90 may be adjusted based on specific blasting situations.

In some embodiments, the plurality of level sensors 90 may comprise a plurality of subsets of level sensors 90. For example, the plurality of level sensors 90 may comprise a first subset 93 of level sensors 90 in which the level sensors 90 are equally spaced apart from each other a first predetermined distance. The plurality of level sensors 90 may comprise a second subset 94 of level sensors 90 in which the level sensors 90 are equally spaced apart from each other a second predetermined distance. The first predetermined distance and the second predetermined distance may be different from each other. In some embodiments, the first predetermined distance is less than the second predetermined distance. Accordingly, the level sensors 90 of the first subset 93 are closer to each other than the level sensors 90 of the second subset 94. While not illustrated, the delivery apparatus 80 may comprise more than two subsets of level sensors 90. The delivery apparatus 80 may also include level sensors 90 that are disposed closer to the proximal end than the distal end 84.

In some embodiments, the delivery apparatus 80 may comprise a baiting sensor 98. The baiting sensor 98 may be disposed near the distal end 84 of the delivery apparatus 80. The baiting sensor 98 is configured to detect the presence of a detonator and/or booster in the blasthole 300. The baiting sensor 98 may be an RFID reader and a detonator and/or booster may comprise an RFID tag. The RFID reader may detect the presence of the detonator and/or booster in the blasthole 300 as the delivery apparatus 80 is lowered into the blasthole 300. The detonator and/or booster may be disposed in a number of different locations in the blasthole 300; for example, the detonator and/or booster may be disposed in the toe or bottom of the blasthole 300, the denotator and/or booster may be placed between the top and the bottom of the blasthole 300, or the detonator and/or booster may be placed at the top of the blasthole 300. In some embodiments, there may be a plurality of detonators and/or boosters disposed in the blasthole 300 and the baiting sensor 98 may detect all of the detonators and/or boosters in the blasthole 300. The baiting sensor 98 may use a variety of different technologies to detect the detonator and/or booster. For example, the baiting sensor 98 may be an optical sensor, a magnetic sensor, an electromagnetic sensor, and the like.

The delivery apparatus 80 may further include additional or parameter sensors 87. In the illustrated embodiment, the sensors 87 are disposed on an outer surface of the nozzle 88, however, the sensors 87 may be disposed along the length of the delivery apparatus 80. The sensors 87 may be able to sense a number of different parameters. For example, the sensors 87 could measure one or more of the pH, density, additives in the explosive, temperature, and the like. Each sensor 87 may measure one of the different parameters listed above, or the sensors 87 may be able to measure a variety of the parameters listed above. The sensors 87 may also be configured to measure one or more parameters of the explosive composition or one or more parameters of the condition of the blasthole. Similar to the plurality of level sensors 90, the sensors 87 may be hardwired to the explosives delivery system 100 and to the mobile processing unit 200 through wires in the sidewall 86 or on the outer surface of the delivery apparatus 80 of the delivery apparatus 80. In some embodiments, the sensors 87 may communicate with the explosives delivery system 100 and to the mobile processing unit 200 wirelessly.

While the sensors 87 are illustrated as separate from the level sensors 90, in some embodiments, the level sensors 90 may be able to additionally measure some of the parameters listed above. As set forth below, in some embodiments one or more characteristics of the explosive can be adjusted based on the one or more sensed parameters.

FIG. 2B illustrates the delivery apparatus 80' in accordance with another embodiment. The delivery apparatus 80' may comprise a delivery hose. In the illustrated embodiment, the delivery apparatus 80' comprises a plurality of level sensors 90' disposed on a nozzle 88' of the delivery apparatus 80' or at a distal end of the delivery apparatus 80'. The plurality of level sensors 90' include a first level sensor 91' disposed a predetermined distance from the distal end 84' of the delivery apparatus 80'. The plurality of level sensors 90' further includes second and third level sensors 90' disposed on the nozzle 88'. In some embodiments, the delivery apparatus 80' may further include an additional level sensor 90' that is disposed at a distance above the other level sensors 90', or at a distance that is above the nozzle 88'. In such embodiments, the additional level sensor 90' may act as a check on the plurality of sensors 90' and 91' disposed on the nozzle 88'.

Figure 5A:
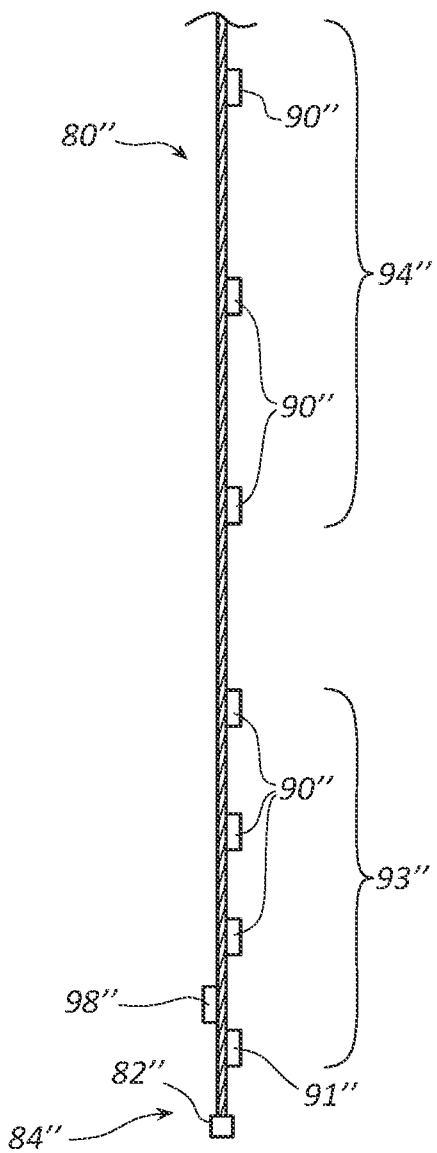
FIG. 5A illustrates a side view of a dipping cable having a plurality of level sensors disposed along an outer surface of the cable according to another embodiment of the present disclosure.

In some embodiments, a plurality of level sensors 90" may be disposed on a dipping cable 80" rather than the explosive delivery apparatus 80, as illustrated in FIG. 5A. In either circumstance, the delivery apparatus 80 or the dipping cable 80" may be called an extension member. The dipping cable 80" may comprise weight 82" that is disposed at a distal end 84" of the dipping cable 80". The dipping cable 80" may be lowered in the blasthole 300 and use the plurality of level sensors 90" to determine if and how much liquid (e.g., water and/or explosive) is in the blasthole 300, the distal most level sensor labeled 91". The plurality of level sensors 90" may be equally spaced apart. Similar to the delivery apparatus 80, the plurality of level sensors 90' may comprise a first subset 93" of level sensors 90 in which the level sensors 90 are equally spaced apart a first predetermined distance and a second subset 94" of level sensors 90" in which the level sensors 90" are equally spaced apart. The first predetermined distance is less than the second predetermined distance. The dipping cable 80" may also comprise a baiting sensor 98" for detecting the presence of a detonator in the blasthole 300.

Figure 5B:
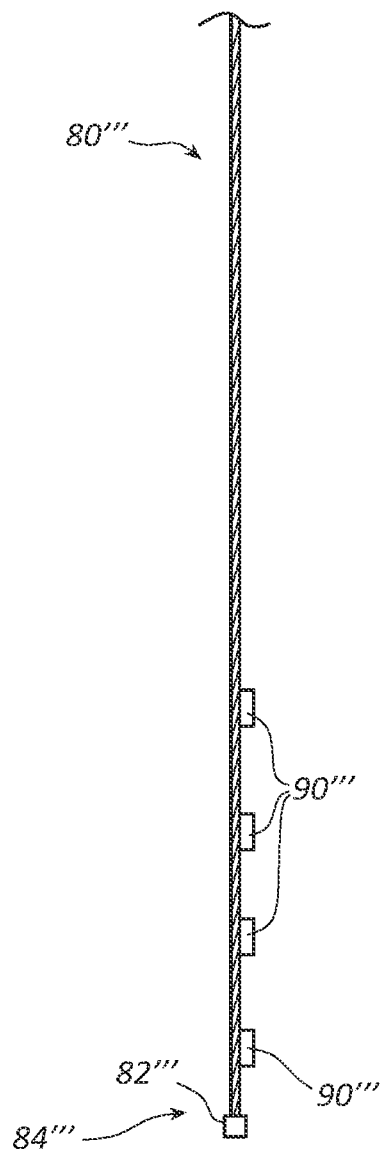
FIG. 5B illustrates a side view of a dipping cable having a plurality of level sensors disposed near a distal end of the dipping cable according to another embodiment of the present disclosure.

FIG. 5B illustrates another embodiment of a dipping cable 80'''. The dipping cable 80''' may comprise a weight 82" that is disposed at a distal end 84" of the dipping cable 80'''. The dipping cable 80''' may have a plurality of level sensors 90''' that are only disposed near the distal end 84" of the dipping cable 80''' to determine the presence of liquid (e.g., water and/or explosive) in the blasthole 300.

FIG. 6 illustrates a delivery apparatus 80 that comprises a communication medium 95 (e.g., network cable). The communication medium 95 is configured to communicate with the plurality of level sensors 90. The communication medium 95 may be directly coupled to enable communication between the communication medium 95 and the plurality of level sensors 90 or the communication medium 95 may communicate with the plurality of level sensors 90 over a wireless network. The communication medium 95 may be a wire with a plurality of receivers 96 for receiving data from the plurality of level sensors 90 over a wireless network. The plurality of receivers 96 may be disposed along a length of the communication medium 95. The data received from the plurality of receivers 96 may be communicated to a processing circuitry 210 that is disposed in the cabin 202 of the mobile processing unit 200 or in a remote location, such as a mining control room. The communication medium 95 may be disposed within the sidewall 86 of the delivery apparatus 80, on the inside surface of the delivery apparatus 80, or on the outer surface 83 of the delivery apparatus 80. FIG. 7 illustrates a front view of one of the level sensors 90 that comprises a transmitter 97. Each level sensor 90 may comprise a transmitter from transmitting data to one of the communication medium 95. In some embodiments, the plurality of level sensors 90 are capacitance sensors that transmit a capacitance of a predetermined surrounding area of the level sensor 90.

FIG. 8 illustrates the dipping cable 80" comprising a communication medium 95" with a plurality of receivers 96" for receiving data from the plurality of level sensors 90" disposed along the outer surface of the dipping cable 80" with the distalmost sensor labeled 91".

FIGS. 9, 11, and 13 illustrate the delivery apparatus 80 performing dipping and loading in substantially the same step or process. FIG. 9 illustrates a blasthole 300 with water disposed in the blasthole 300. The delivery apparatus 80 is lowered into the blasthole 300 until the distal end 84 of the delivery apparatus approaches a toe 302 of the blasthole 300. For convenience of illustration, only a distal portion of the delivery apparatus 80 and a distal portion of the blasthole 300 are illustrated. The depth of the blasthole 300 may have been previously obtained from the drilling process; however, the depth of the blasthole 300 may be confirmed by the delivery apparatus 80 based on the length of the delivery apparatus 80 that has been unwound from a delivery apparatus reel 81. The depth of the blasthole 300 may be used later during the dipping and loading process.

As discussed previously, the delivery apparatus 80 comprises a plurality of level sensors 90. For convenience of explanation, only four level sensors 90 are illustrated in FIG. 9. The level sensor disposed closest to the distal end 84 of the delivery apparatus 80 is labeled $90_1$, the next level sensor up the delivery apparatus is labeled $90_2$, the next sensor up the delivery apparatus is labeled $90_3$, and the next sensor up the delivery apparatus is labeled $90_4$.

The plurality of the level sensors 90 are used to dip the blasthole 300 by detecting if there is any water 400 in the blasthole 300. In the illustrated example, water 400 is present in the blasthole 300 and the level sensors $90_1$ and $90_2$ detect water and level sensors $90_3$ and $90_4$ detect air. The chart of FIG. 10 illustrates the findings of each level sensor 90. However, if there was no water in the blasthole 300, then the plurality of level sensors 90 would detect only air and not water. The level sensors 90 may be capacitance sensors and they may detect capacitance of the medium in which the level sensor 90 is disposed. The level sensors 90 then transmit the capacitance data to the communication medium 95 and to the processing circuitry 210. The level sensors 90 detect a different capacitance for air, water, and explosive; therefore, each level sensor 90 would be able to detect what medium it is disposed in.

In some embodiments, the plurality of level sensors 90 may each be a combo sensor that detects capacitance and conductance at a predetermined surrounding area of the level sensor 90. Each of the plurality of level sensors 90 may transmit capacitance data and conductance data to the communication medium 95 and to the processing circuitry 210. The processing circuitry 210 may compare the conductance data and capacitance data for each level sensor 90 to determine what medium each of the plurality of level sensors 90 is disposed in.

The level (e.g., depth) of the water 400 in the blasthole 300 may also be detected based on what level sensors 90 detect water. In the illustrated embodiment, the water is disposed between adjacent level sensors $90_2$ and $90_3$. Therefore, the level of the water 400 would be the distance from the distal end 84 of the delivery apparatus 80 to between the level sensors $90_2$ and $90_3$. The accuracy of the level measurement would be dependent upon the distance between adjacent level sensors 90. In use, the plurality of level sensors 90 allow for error checking as the level sensors 90 should react in order (e.g., $90_1$, $90_2$, $90_3$, $90_4$) as they are immersed in water. Where the order is unexpected (e.g., $90_4$ detects water but $90_1$ does not), an error handling routine may be invoked to determine the error.

Once the processing circuitry 210 of the mobile processing unit 200 determines if there is water 400 in the blasthole 300, the processing circuitry 210 may determine which explosive to use. If no water 400 is detected, then the ANFO explosive may be loaded into the blasthole 300. If water 400 is detected, such as shown in FIG. 9, then the sensitized emulsion explosive may be loaded in the blasthole 300.

FIG. 11 illustrates the sensitized emulsion explosive 500 being loaded into the blasthole 300. The sensitized emulsion explosive 500 is denser than the water 400, so when the sensitized emulsion explosive 500 is loaded into the blasthole 300, the water 400 stays on top of the sensitized emulsion explosive 500. The level sensors $90_1$ and $90_2$ detect the sensitized emulsion explosive 500 and the level sensors $90_3$ and $90_4$ detect water. The sensitized emulsion explosive 500 may be loaded into the blasthole 300 at a predetermined flow rate. The flow rate may be determined by the processing circuitry 210 and the flow rate may be altered by the processing circuitry 210 based on the circumstances of loading of the blasthole 300 with the sensitized emulsion explosive 500. The chart of FIG. 12 illustrates the findings of each level sensor 90.

As the sensitized emulsion explosive 500 is loaded in the blasthole 300, the delivery apparatus 80 may be retracted from the blasthole 300. The processing circuitry 210 may control the retraction of the delivery apparatus 80 at a predetermined rate by winding the delivery apparatus 80 onto the delivery apparatus reel 81. FIG. 13 illustrates the delivery apparatus 80 loading more sensitized emulsion explosive 500 into the blasthole 300 while the delivery apparatus 80 is retracted from the blasthole 300. The level sensors $90_1$ and $90_2$ detect the sensitized emulsion explosive 500 and the level sensors $90_3$ and $90_4$ detect water. The chart of FIG. 14 illustrates the findings of each level sensor 90. The processing circuitry 210 may maintain the retraction of the delivery apparatus 80 at a predetermined rate such that the level of the sensitized emulsion explosive is consistently maintained between two adjacent level sensors 90, such as the level sensors $90_2$ and $90_3$.

The amount (e.g., volume) of the sensitized emulsion explosive 500 may be determined based on the level (e.g., depth) of the sensitized emulsion explosive 500. The level of the sensitized emulsion explosive 500 may be determined by where the sensitized emulsion explosive 500 is currently disposed along the length of the delivery apparatus 80 (e.g., between level sensors $90_2$ and $90_3$), the length of the delivery apparatus 80 currently in the blasthole 300, and the depth of the blasthole 300 itself. The depth of the blasthole 300 may be determined from the drilling operation and may be confirmed when the delivery apparatus 80 is lowered to the toe 302 of the blasthole 300 at the beginning of the dipping and loading process. Based on the measurements that are communicated to the processing circuitry 210 via the communication medium 95, the processing circuitry 210 may determine the depth of the sensitized emulsion explosive 500 in the blasthole 300.

In addition, the diameter of the blasthole 300 is needed to calculate the volume of the sensitized emulsion explosive 500 that is currently in the blasthole 300. The diameter of the blasthole 300 may be determined from the drilling operation. The amount of the sensitized emulsion explosive 500 is the blasthole 300 should correspond with the amount of the sensitized emulsion explosive 500 that has been loaded into the blasthole 300 based on the flow rate of the sensitized emulsion explosive 500 into the blasthole 300. If the volume of the sensitized emulsion explosive 500 does not match, the processing circuitry 210 determines that the blasthole 300 may not have structural integrity. In other words, there may be a crack in the blasthole 300 and the sensitized emulsion explosive 500 may be leaking out of the blasthole 300. If this is the case, the processing circuitry 210 may issue a warning to the operator or stop loading the sensitized emulsion explosive 500 into the blasthole 300 so the structural integrity may be determined. Determining structural integrity of the blasthole 300 is part of the dipping process; thus, the delivery apparatus 80 is configured to dip and load the blasthole 300 substantially at the same time.

Figure 15:
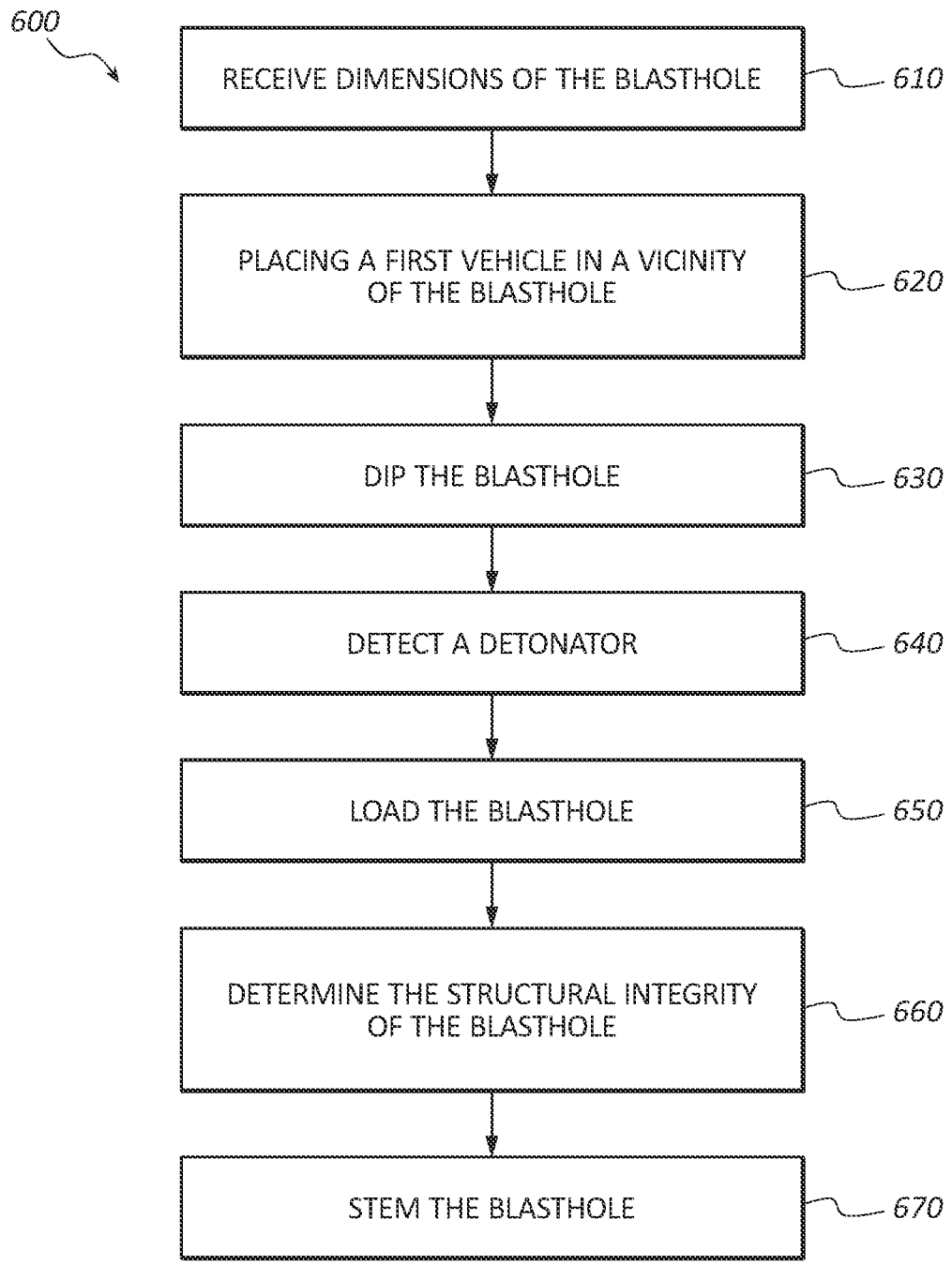
FIG. 15 illustrates a flow chart of dipping and loading a blasthole according to an embodiment of the present disclosure.

FIG. 15 illustrates a flow chart of a method 600 of dipping and loading the blasthole 300 according to one embodiment of the present disclosure. Some steps of the method 600 may be executed by processing circuitry, such as the processing circuitry 210 of the mobile processing unit 200 of FIG. 1. In some embodiments, the processing circuitry 210 is disposed in a location that is remote to the mobile processing unit 200, such as a mining control room.

The method 600 comprises a step 610 of receiving the dimensions of the blasthole 300. The dimensions may have been obtained during the drilling of the blasthole 300. The dimensions may be provided to the processing circuitry 210 performing the dipping and loading of the blasthole 300. Dimensions of the blasthole may include the depth of the blasthole 300, the diameter of the blasthole 300, the volume of the blasthole 300, and the like.

The method 600 may further comprises a step 620 of placing a first vehicle in a vicinity of the blasthole 300. The first vehicle may be the mobile processing unit 200. As discussed above, the mobile processing unit 200 may be a vehicle that is manually controlled by an operator, or may be remotely controlled by an operator, or the vehicle may be autonomous. In some embodiments, the first vehicle may be a land-based autonomous vehicle and, in some embodiments, the first vehicle may be an aerial autonomous vehicle.

The method 600 may further comprises a step 630 of dipping the blasthole 300. As discussed above, the blasthole 300 may be dipped by placing the delivery apparatus 80 into the blasthole 300 or placing the dipping cable 80" into the blasthole 300. The delivery apparatus 80 may be unwound from the delivery apparatus reel 81 and lowered into the blasthole 300. The lowering of the delivery apparatus 80 may be controlled by the processing circuitry 210 and done at a predetermined rate. Once the delivery apparatus 80 approaches the toe 302 of the blasthole 300, the depth of the blasthole 300 may be confirmed by comparing the length of the delivery apparatus unwound from the delivery apparatus reel 81 minus the distance from the delivery apparatus reel 81 to the ground 50 to the depth previously determined by the drilling procedure. If the difference between the depth obtained via drilling and the depth measured by the delivery apparatus 80 is greater than a predetermined threshold, additional investigation may be performed to determine the structural integrity of the blasthole 300. The calculations and comparing may be performed by the processing circuitry 210.

After the depth of the blasthole 300 is confirmed, the delivery apparatus 80 may determine the presence of water 400 in the blasthole 300 by using the plurality of level sensors 90 as previously discussed. If water 400 is present in the blasthole 300, then the level of the water 400 may be determined. In some embodiments, the delivery apparatus 80 is inserted into the blasthole 300 without performing a separate dipping step to determine a level of any water 400 in the blasthole 300.

Alternatively, the blasthole 300 may be dipped using the dipping cable 80" by lowering the dipping cable 80" into the blasthole to determine if water 400 is present, and if so, how much water 400 is present.

The method 600 may further include the step 640 of detecting the presence of a detonator and/or booster in the blasthole 300. As discussed above, the delivery apparatus 80 may comprise a baiting sensor 98 to detect a detonator and/or booster disposed in the blasthole 300. In some embodiments, the detonator and/or booster is placed at the toe 302 of the blasthole 300. In some embodiments, the detonator and/or booster is placed between the toe 302 and the top of the blasthole 300. In some embodiments, the detonator and/or booster is placed at the top of the blasthole 300. By detecting the detonator and/or booster, the processing circuitry 210 may determine if the detonator and/or booster was placed correctly.

The method 600 may further include the step 650 of loading the blasthole 300 with explosive. The type of explosive loaded into the blasthole 300 may be dependent on whether or not water 400 is present in the blasthole 300. If water 400 is present in the blasthole 300, then sensitized emulsion explosive 500 is loaded into the blasthole 300, and if no water 400 is present, then ANFO is loaded into the blasthole 300. Blends of emulsions and ANFO can also be used as desired. Similarly, water gel explosives or other types of explosives can also be used as desired. The flow rate of the explosive into the blasthole 300 may be controlled by the processing circuitry 210.

During the loading of explosive into the blasthole 300, the delivery apparatus 80 may be retracted from the blasthole 300 and wound back onto the delivery apparatus reel 81. The processing circuitry 210 may control the retraction rate of the delivery apparatus 80 from the blasthole 300. The retraction rate may be a predetermined rate that is constant. In some embodiments, the retraction rate is variable and can change over the course of retracting the delivery apparatus 80 from the blasthole 300. In some embodiments, the delivery apparatus 80 is retracted from the blasthole 300 at a rate that keeps the level of the explosive between adjacent level sensors 90 during the entire retraction of the delivery apparatus 80 from the blasthole 300 until the delivery apparatus 80 reaches the top of the blasthole 300.

During the loading process, the processing circuitry 210 may receive one or more other measurements from the sensors 87 (which can be disposed on the nozzle or at the distal end of a delivery hose). As discussed above, the sensors 87 can be configured to measure one or more of a variety of different parameters, such pH, the density of the explosive, additives in the explosive, temperature, and the like. These one or more sensed parameters can be characteristics of the explosive compositions and/or conditions within the blasthole. The data received from the sensors 87 by the processing circuitry 210 may also be used to affect the delivery and/or characteristics of the explosive being loaded into the blasthole. For example, one or more parameters or characteristics of the explosive can be adjusted in response to the one or more sensed parameters. In a particular example, the density of the explosive may be adjusted if the sensed density to is too high or too low based relative to a predetermined density range. In one embodiment, the density may be adjusted by adding more of the sensitizing agent or reducing the amount of the sensitizing agent in the explosive. The processing circuitry 210 may also adjust the parameters of the explosive based on other detected or sensed parameters (e.g., such as if the sensed parameter is not within a predetermined range).

In some embodiments, the processing circuitry 210 automatically loads the explosive into the blasthole without input from an operator. In other words, the loading of the blasthole with explosive may be automated. The processing circuitry 210 may control one or more of the rate the explosive is loaded into the blasthole 300, the rate of retraction of the delivery apparatus 80 from the blasthole 300, the pH of the explosive, the density of the explosive, the temperature of the explosive, what additives are added to the explosive, and the like.

The method 600 may further include the step 660 of determining the structural integrity of the blasthole 300. As discussed above, this step 660 is also a part of the dipping and loading process. The processing circuitry 210 determines the level and volume of the explosive in the blasthole 300 by using the data received from the plurality of level sensors 90. The processing circuitry 210 determines the level and volume of the explosive in the blasthole 300 and determines if the explosive is filling the blasthole 300 at a rate consistent with the flow rate of the explosive into the blasthole 300. If the processing circuitry 210 determines that the volume of the explosive in the blasthole 300 does not match the volume of explosive loaded into the blasthole 300, the processing circuitry 210 determines that the blasthole 300 may not have structural integrity. In other words, there may be a crack or cavity in the sidewall of the blasthole 300 and the explosive may be leaking out of the blasthole 300 or the blasthole 300 may have partially collapsed, reducing the volume of the blasthole 300. If this is the case, the processing circuitry 210 may issue a warning to the operator or stop loading the explosive into the blasthole 300. The operator may then determine the integrity of the blasthole 300.

The method 600 may further include the step 670 of stemming the top of the blasthole 300 with inert material after the explosive has been loaded into the blasthole 300.

Figure 16:
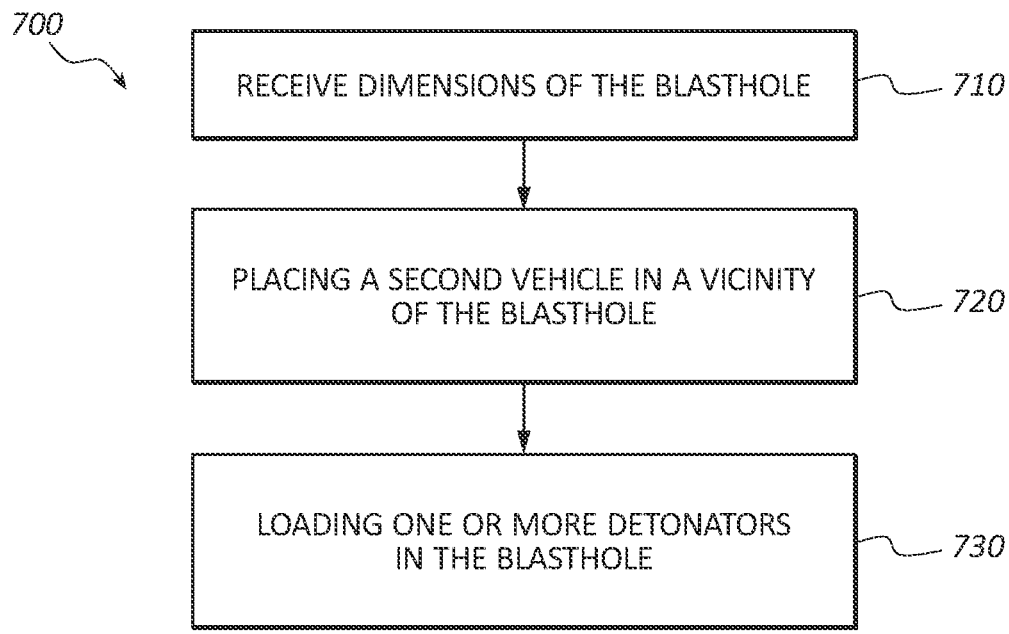
FIG. 16 illustrates a flow chart of dipping and baiting a blasthole according to an embodiment of the present disclosure.

FIG. 16 illustrates a flow chart of a method 700 of dipping and baiting the blasthole 300 according to one embodiment of the present disclosure. Some steps of the method 700 may be executed by processing circuitry. The processing circuitry may be different than the processing circuitry 210 previously disclosed. This processing circuitry 210 may be disposed on a second vehicle that acts as a baiting vehicle or the processing circuitry 210 may be disposed in a remote location, such as a mining control room.

The method 700 comprises a step 710 of receiving the dimensions of the blasthole 300. The dimensions may have been obtained during the drilling of the blasthole 300. The dimensions may be provided to the processing circuitry performing the baiting of the blasthole 300. Dimensions of the blasthole 300 may include the depth of the blasthole 300, the diameter of the blasthole 300, the volume of the blasthole 300, and the like.

The method 700 may further comprise a step 720 of placing the second vehicle in a vicinity of the blasthole 300 when the first vehicle is not within the vicinity of the blasthole 300. The second vehicle may be a baiting vehicle that stores a plurality of detonators and/or boosters. The first vehicle and the second vehicle are kept separate from each other to keep the detonators and/or boosters away from the explosive before loading them into the blasthole 300. As discussed above, the second vehicle may be manually controlled by an operator, may be remotely controlled by an operator, or may be autonomous. In some embodiments, the second vehicle may be a land-based autonomous vehicle, and, in some embodiments, the first vehicle may be an aerial autonomous vehicle.

The method 700 may further comprise a step 730 of loading one or more of the plurality of detonators and/or boosters into the blasthole 300. In some embodiments, the detonator and/or booster is placed at the toe 302 of the blasthole 300. In some embodiments, the detonator and/or booster is placed between the toe 302 and the top of the blasthole 300. In some embodiments, the detonator and/or booster is placed at the top of the blasthole 300. In some embodiments, multiple detonators and/or boosters are placed in the blasthole 300.

The detonator and/or booster may be placed in the blasthole 300 by a baiting assembly. The baiting assembly may be a robotic arm that may be inserted into the blasthole 300 to place the detonator and/or booster in the blasthole 300. The robotic arm comprises a plurality of level sensors that are disposed along an outer surface of the robotic arm. The plurality of level sensors may function similar to the level sensors 90 previously discussed to determine if water 400 is present in the blasthole 300 before the detonator is placed in the blasthole 300. Accordingly, the baiting assembly may perform dipping and baiting of the blasthole 300 without performing a separate dipping step.

The method 700 may be performed at various points of preparing the blasthole 300 for detonation. For example, the blasthole 300 may be baited by the second vehicle before dipping is performed by the first vehicle. The blasthole 300 may also be baited by the second vehicle after loading the blasthole 300 by the first vehicle.

Alternatively, the blasthole 300 may be dipped using the dipping cable 80" by lowering the dipping cable 80" into the blasthole 300 to determine if water 400 is present, and if so, how much water 400 is present.

Some general discussion of the processing circuitry 210 and/or computer system will now be described with respect to FIG. 17. The computer system may, for example, be hand-held devices, appliances, laptop computers, desktop computers, mainframes, distributed computing systems, datacenters, or even devices that have not conventionally been considered a computing system, such as wearables (e.g., glasses, smart watches, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 17:
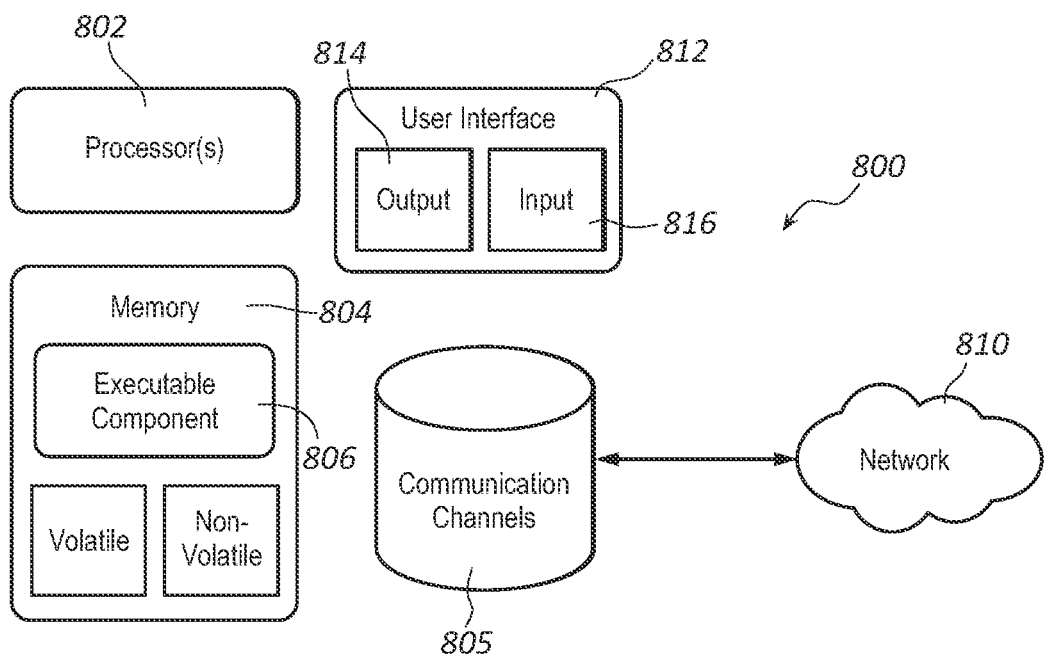
FIG. 17 illustrates an example computer architecture that facilitates operation of the principles described herein according to one embodiment of the present disclosure.

As illustrated in FIG. 17, in its most basic configuration, a computing system 800 typically includes at least one hardware processing unit 802 (or processors(s) 802) and memory 804. The memory 804 may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well.

The computing system 800 also has thereon multiple structures often referred to as an "executable component." For instance, the memory 804 of the computing system 800 is illustrated as including an executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth that may be executed on the computing system, whether such an executable component exists in the heap of a computing system or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component is binary). Alternatively, the structure may be configured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component," "service," "engine," "module," "control," or the like may also be used. As used in this description and in the case, these terms (whether expressed with or without a modifying clause) are also intended to be synonymous with the term "executable component," and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 804 of the computing system 800. The computing system 800 may also contain communication channels 805 that allow the computing system 800 to communicate with other computing systems over, for example, network 810.

While not all computing systems require a user interface, in some embodiments, the computing system 800 includes a user interface 812 for use in interfacing with a user. The user interface 812 may include output 814 (or output mechanism(s) 814) as well as input 816 (or input mechanism(s) 816). The principles described herein are not limited to the precise type of output 814 or type of input 816 as such will depend on the nature of the device. However, output 814 might include, for instance, speakers, displays, tactile output, holograms, and so forth. Examples of input 816 might include, for instance, microphones, touchscreens, holograms, cameras, keyboards, mouse of other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium, that can be used to store desired program code means in the form of computer-executable instructions or data structures and that can be accessed by a general-purpose or special-purpose computing system.

A "network" (e.g., the network 810) is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data that, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses), and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 18:
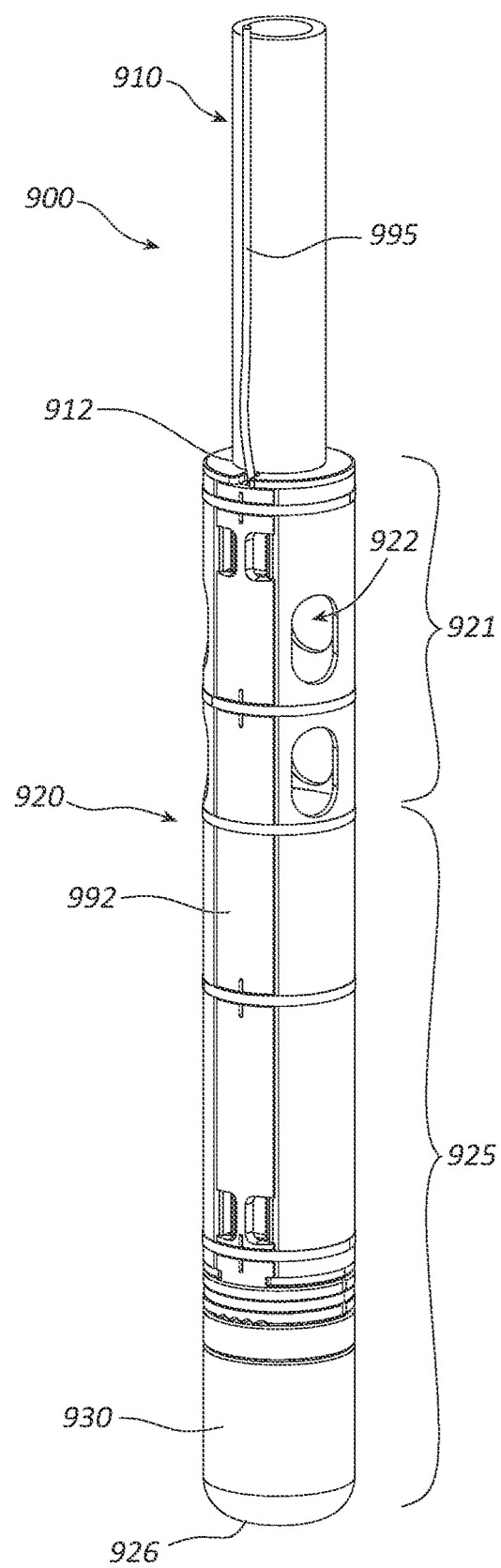
FIG. 18 illustrates a detailed view of a distal portion of a delivery apparatus according to one embodiment of the present disclosure.
Figure 19:
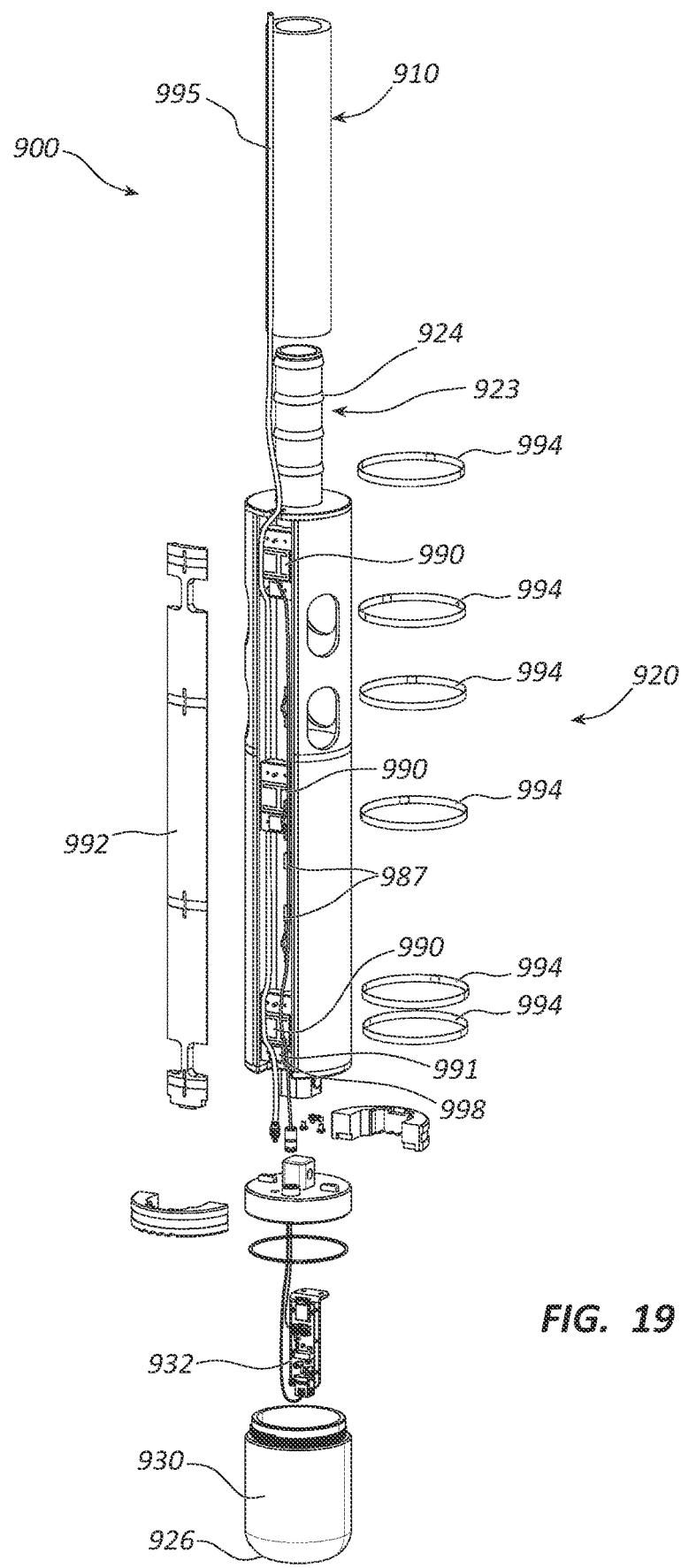
FIG. 19 illustrates an exploded view of the distal portion of the delivery apparatus of FIG. 18.

FIGS. 18-20 illustrate a distal portion of a delivery apparatus 900 according to one embodiment of the present disclosure. FIG. 18 illustrates a detailed view of a distal portion of the delivery apparatus 900, FIG. 19 illustrates an exploded view of the distal portion of the delivery apparatus 900, and FIG. 20 illustrates a cross-sectional view of the distal portion of the delivery apparatus 900.

The delivery apparatus 900 is configured to deliver an explosive, such as an emulsion from a source. The source may be in the mobile processing unit 200 discussed above. The delivery apparatus 900 may include a hose 910 and a nozzle 920, the nozzle 920 having a plurality of outlets 922. The hose 910 of the delivery apparatus 900 may have a central bore that extends a length of the hose 910 form a proximal end (not shown) to a distal end 912. The explosive may be outputted through the plurality of outlets 922 of the nozzle 920 after it traverses the hose 910. The nozzle 920 may have a proximal portion 921 and a distal portion 925. The plurality of outlets 922 may be disposed in a proximal portion 921 of the nozzle 920. The plurality of outlets 922 may be spaced apart from each other on the outer surface of the proximal portion 921 of the nozzle 90$_2$.

As illustrated in FIG. 19, the nozzle 920 further comprises a mating neck 923 that is configured to be inserted into the hose 910. The mating neck 923 may comprise a plurality of circumferential ribs 924 that project from the mating neck 923 and are vertically or axially spaced apart from each other. The mating neck 923 may create an interference fit with the hose 910 to couple the nozzle 920 to the hose 910 when the mating neck 923 is inserted into the distal end 912 of the hose 910. The nozzle 920 is removable from the hose 910 such that the nozzle may be used with different hoses.

The nozzle 920 may further comprise a plurality of level sensors 990, similar to the level sensors 90 discussed above. The illustrated embodiment illustrates three level sensors 90 on the nozzle 920; however, the delivery apparatus 900 may have more or less than three level sensors 990. The plurality of level sensors 990 are configured to determine if each sensor of the plurality of level sensors 990 are disposed in air, water, or explosive product. The plurality of level sensors 990 may be used to determine the presence or level (e.g., depth) of a fluid in the blasthole 300 as described above in relation to FIGS. 9-14. In the illustrated embodiment, the level sensors 990 are disposed behind a removable protective cover 992. The protective cover 992 may be secured to the nozzle 920 by a plurality of cable ties 994 that wrap around the nozzle 920 and secure the protective cover in place during dipping and loading. In some embodiments, the level sensors 990 are disposed on the underside of the protective cover 992.

As discussed above, in some embodiments, the plurality of level sensors 990 may comprise a pair of metal plates that are parallel with each other. In some embodiments, an additional level sensor 990 may be disposed on the outer surface of the hose 910 to serve as a check on the other level sensors 990.

In some embodiments, the nozzle 920 may further comprise a conductive sensor 991. Conductive sensor 991 may work in combination with the most distal level sensor 990 to detect the level of fluids within the blasthole 300.

In some embodiments, the delivery apparatus 900 may comprise one or more additional or parameter sensors 987. In the illustrated embodiment, the sensors 987 are disposed beneath the protective cover 992, however, the sensors 987 may be disposed along the length of the delivery apparatus 900. The sensors 987 may be able to sense a number of different parameters. For example, the sensors 987 could measure pH, density, additives in the explosive, temperature, and the like. Each sensor 987 may measure one of the different parameters listed above, or the sensor 987 may be able to measure of variety of the listed parameters listed above. Further, each sensor 987 may measure one or more parameters of the explosive composition, or one or more parameters of the condition of the blasthole.

In some embodiments, the delivery apparatus 900 may comprise a baiting sensor 998. In the illustrated embodiment, the baiting sensor 998 is disposed beneath the protective cover 992, however, the baiting sensor 998 may be placed in a variety of different locations. The baiting sensor 998 is configured to detect the presence of a detonator and/or booster in the blasthole 300 and may be similar to the baiting sensor 98 discussed above.

The nozzle 920 may further include a weight 996 as seen in the cross-sectional view of the delivery apparatus 900 in FIG. 20. The weight 996 may be disposed within the nozzle 920 in the distal portion 925 of the nozzle 920 to help the nozzle 920 sink in a fluid, such as water or an explosive (e.g., emulsion).

The delivery apparatus 900 may further comprise a communication medium 995 (network cable). The communication medium 995 is configured to communicate with the plurality of level sensors 990. The communication medium 995 may be directly coupled to the level sensors 990 to enable communication between the communication medium 995 and the plurality of level sensors 990 or the communication medium 995 may communicate with the plurality of level sensors 990 over a wireless network. The data from the plurality of level sensors 990 may be communicated to the processing circuitry 210 (described above). The communication medium 995 may be disposed within a sidewall of delivery apparatus 900, on the inside surface of the delivery apparatus 900, or on the outer surface of the delivery apparatus 900. In the illustrated embodiment, the communication medium 995 is disposed on the outer surface of the hose 910 and disposed within the protective cover 992 of the nozzle 920. In some embodiments, the communication medium 995 includes a connection 993 that couples the communication medium 995 of the hose 910 and the communication medium 995 on the nozzle 920, making the nozzle 920 interchangeable with other hoses.

The data from each of the plurality of sensors 990, the additional or parameter sensors 987, and the conductive sensor 991 may be transmitted to the communication medium 995. The communication medium 995 may be hardwired to the sensors 990, 987, 991, and 998 or the data may be transmitted to the communication medium 995 wirelessly.

The nozzle 920 may further include a sealed chamber 930 at a distal end 926 of the nozzle 920. The sealed chamber 930 is hermetically sealed preventing water, explosive, or other environmental factors from entering the sealed chamber 930. The sealed chamber 930 may comprise a control unit 932. The communication medium 995 is configured to enter the sealed chamber 930 to communicate with the control unit 932. The control unit 932 may be similar to the processing circuitry 210 discussed above. In some embodiments, the control unit 932 communicates with the processing circuitry 210 that is disposed in a remote location from the sealed chamber 930. The control unit 932 is configured to determine whether each of the level sensors 990 is disposed in air, water, or explosive.

The control unit 932 may automate the dipping and loading process. The delivery apparatus 900 may be lowered into the blasthole 300 and the control unit 932 using the data from the plurality of level sensors 990 may determine if there is any liquid (e.g., water or explosive) present in the blasthole 300. The control unit 932 may also determine if the blasthole has been baited using the data from the baiting sensor 998 to determine if there is a detonator and/or booster in the blasthole 300. The control unit 932 may determine what type of explosive to use based on the presence of water and from any data provided during the drilling of the blasthole 300, such as the dimensions of the blasthole 300, the geology of the blasthole, etc. which may be loaded or sent to the control unit 932.

The control unit 932 may then begin the loading process by delivering explosive to the blasthole 300. As explosive is delivered to the blasthole 300 via the delivery apparatus 900, the data from the plurality of level sensors 990 is sent to the control unit 932. The control unit 932 monitors the depth of the explosive in the blasthole 300 (as the location of the plurality of level sensors 990 from the distal end 926 of the nozzle 920 is known) and may begin to retract the delivery apparatus 900 from the blasthole. The height of the explosive may be maintained at a specific location between two vertically adjacent level sensors 990.

The control unit 932 may monitor the structural integrity of the blasthole 300. The structural integrity of the blasthole 300 may be determined because the control unit 932 knows the amount of explosive loaded into the blasthole 300 and can determine if the explosive is leaking from the blasthole 300. This is done by comparing the amount of explosive loaded in the blasthole 300 versus the volume of explosive currently in the blasthole 300. If there a crack in the blasthole 300, explosive will leak out of the blasthole 300 and the volume in the blasthole will not match the amount loaded into the blasthole 300.

In addition, the control unit 932 may adjust one or more parameters of the explosive as it is being loaded into the blasthole 300 or vary the loading of the explosive into the blasthole 300. For example, based on data collected from the additional or parameter sensors 987, such as density, temperature, pH, additives, etc., the control unit 932 may adjust the explosive composition that is being pumped into the blasthole 300 in response to a sensed parameter, such as temperature, pH, density, additives, etc. For example, the amount of sensitizing agent added to an emulsion may be increased or decreased to adjust the density of the emulsion. Other parameters and/or characteristics of the explosive may also be adjusted as desired.

This dipping and loading process may be monitored by an operator. The operator monitors the dipping and loading process and may override the control unit 932 if the operator determines it is necessary.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An explosive delivery apparatus comprising:
    a sidewall;
    a central bore that extends a length of the explosive delivery apparatus from a proximal end to a distal end of the explosive delivery apparatus;
    an outlet disposed at the distal end of the explosive delivery apparatus;
    a plurality of level sensors disposed on an outer surface of the explosive delivery apparatus and that are dispersed along the explosive delivery apparatus, wherein the plurality of level sensors is configured to determine if each of the sensors is disposed in water, air, or explosive;
    a communication medium coupled to the explosive delivery apparatus; and
    a control unit in communication with the plurality of level sensors via the communication medium,
    wherein the plurality of level sensors comprise a plurality of subsets of level sensors, wherein a first subset of level sensors is disposed at a distal end of the explosive delivery apparatus that is configured to be inserted into a blasthole, wherein the first subset of level sensors are spaced apart from each other a first predetermined distance along the explosive delivery apparatus.

2. The explosive delivery apparatus of claim 1, wherein the communication medium is disposed within a sidewall of the explosive delivery apparatus.

3. The explosive delivery apparatus of claim 2, further comprising a conduit disposed in the sidewall of the explosive delivery apparatus and configured to deliver a sensitizing agent to the central bore of the explosive delivery apparatus.

4. The explosive delivery apparatus of claim 1, further comprising a hose head disposed at the distal end of the explosive delivery apparatus.

5. The explosive delivery apparatus of claim 1, wherein the plurality of level sensors include capacitance and conductance sensors that are configured to detect a capacitance and a conductance of a predetermined surrounding area of each capacitance and conductance sensor.

6. The explosive delivery apparatus of claim 5, wherein each of the plurality of capacitance and conductance sensors comprises a pair of metal plates that are disposed on the outer surface of the explosive delivery apparatus.

7. The explosive delivery apparatus of claim 1, wherein the communication medium communicates with the plurality of level sensors over a wireless network.

8. The explosive delivery apparatus of claim 1, wherein the communication medium is hard wired to the plurality of level sensors.

9. The explosive delivery apparatus of claim 1, wherein the plurality of level sensors are spaced from each other along the explosive delivery apparatus.

10. The explosive delivery apparatus of claim 1, further comprising a baiting sensor that is configured to detect a presence of a detonator in a blasthole.

11. The explosive delivery apparatus of claim 10, wherein the baiting sensor is a wireless reader that is configured to detect a presence of a wireless tag disposed on a detonator in a blasthole.

12. An explosive delivery apparatus comprising:
    a sidewall;
    a central bore that extends a length of the explosive delivery apparatus from a proximal end to a distal end of the explosive delivery apparatus;
    an outlet disposed at the distal end of the explosive delivery apparatus;
    a plurality of level sensors disposed on an outer surface of the explosive delivery apparatus and that are dispersed along the explosive delivery apparatus, wherein the plurality of level sensors is configured to determine if each of the sensors is disposed in water, air, or explosive;
    a communication medium coupled to the explosive delivery apparatus;
    a control unit in communication with the plurality of level sensors via the communication medium; and
    a baiting sensor that is configured to detect a presence of a detonator in a blasthole.

13. The explosive delivery apparatus of claim 12, wherein the baiting sensor is a wireless reader that is configured to detect a presence of a wireless tag disposed on a detonator in a blasthole.

14. An explosive delivery apparatus comprising:
    a sidewall;

a central bore that extends a length of the explosive delivery apparatus from a proximal end to a distal end of the explosive delivery apparatus;

a nozzle disposed at the distal end of the explosive delivery apparatus;

an outlet disposed in the nozzle;

a plurality of level sensors disposed within the nozzle, wherein the plurality of level sensors is configured to determine if each of the sensors is disposed in water, air, or explosive;

a communication medium coupled to the explosive delivery apparatus; and a control unit in communication with the plurality of level sensors via the communication medium.

15. The explosive delivery apparatus of claim 14, wherein at least one of the plurality of level sensors is distal to the outlet.

16. The explosive delivery apparatus of claim 14, wherein at least one of the plurality of level sensors is proximal to the outlet.

17. The explosive delivery apparatus of claim 14, wherein the outlet is disposed in a sidewall of the nozzle.

18. The explosive delivery apparatus of claim 14, wherein the nozzle comprises a plurality of outlets disposed in a sidewall of the nozzle.

19. The explosive delivery apparatus of claim 14, wherein the control unit is disposed within a sealed chamber that is distal to the outlet.

20. The explosive delivery apparatus of claim 14, further comprising a removable protective cover that is securable to the nozzle to cover the plurality of level sensors.

\* \* \* \* \*